(12) United States Patent
Zhu

(10) Patent No.: US 10,064,044 B2
(45) Date of Patent: Aug. 28, 2018

(54) METHOD AND APPARATUS FOR DETERMINING ROAMING STATUS OF TERMINAL, TERMINAL, AND SERVER

(71) Applicant: Huawei Technologies Co., Ltd., Shenzhen (CN)

(72) Inventor: Tao Zhu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/512,352

(22) PCT Filed: Sep. 18, 2014

(86) PCT No.: PCT/CN2014/086824
§ 371 (c)(1),
(2) Date: Mar. 17, 2017

(87) PCT Pub. No.: WO2016/041171
PCT Pub. Date: Mar. 24, 2016

(65) Prior Publication Data
US 2017/0280313 A1    Sep. 28, 2017

(51) Int. Cl.
*H04W 4/00* (2018.01)
*H04W 8/02* (2009.01)
*H04W 8/18* (2009.01)

(52) U.S. Cl.
CPC .............. *H04W 8/02* (2013.01); *H04W 8/183* (2013.01)

(58) Field of Classification Search
CPC ......... H04W 8/02; H04W 8/183; H04W 8/26; H04W 12/08; H04W 8/18; H04W 12/06;
(Continued)

(56) References Cited

U.S. PATENT DOCUMENTS 8,145,213 B2 * 3/2012 Park ................ H04W 48/16
455/434
8,467,769 B2 * 6/2013 Pison ................ H04W 88/10
455/410
(Continued)

FOREIGN PATENT DOCUMENTS

CN         1055366 C     8/2000
CN         2444351 Y     8/2001
(Continued)

OTHER PUBLICATIONS

Machine Translation and Abstract of Chinese Publication No. CN1055366, Aug. 9, 2000, 14 pages.
(Continued)

*Primary Examiner* — Mahendra Patel
(74) *Attorney, Agent, or Firm* — Conley Rose, P.C.

(57) ABSTRACT

A method and an apparatus for determining a roaming status of a terminal, a terminal, and a server, which relate to the roaming communications field, and can improve accuracy in determining the roaming status of the terminal. The method includes obtaining, by a terminal, a mobile country code (MCC) and a mobile network code (MNC) that are corresponding to a subscriber identity module (SIM) card in the terminal, and an MCC and an MNC that are corresponding to a terminal network currently accessed by the terminal; determining, by the terminal, a roaming status of the terminal according to the MCC and the MNC that are corresponding to the SIM card, the MCC and the MNC that are corresponding to the terminal network, and a correspondence between a country code, an MCC, an MNC, and an operator.

8 Claims, 8 Drawing Sheets

(58) Field of Classification Search
CPC .. H04W 48/16; G02B 6/29395; H04J 13/105; H04J 13/16; H04M 1/66; H04L 63/0853; H04L 63/107; H04L 63/0876; H04L 12/24; H04L 12/66; H04L 45/16; G06F 9/45; H04B 1/38
USPC .............. 455/432.1, 411; 726/9; 370/390
See application file for complete search history.

(56) References Cited

U.S. PATENT DOCUMENTS

| | | | | |
|---|---|---|---|---|
| 8,849,318 | B2* | 9/2014 | Olofsson | H04W 24/02 455/436 |
| 8,879,526 | B2* | 11/2014 | Noldus | H04Q 3/0025 370/277 |
| 8,886,183 | B2* | 11/2014 | Lindholm | H04W 8/26 455/432.1 |
| 8,954,062 | B2* | 2/2015 | Kuc | H04W 48/18 370/395.2 |
| 9,048,926 | B2* | 6/2015 | Zheng | H04W 8/183 |
| 2005/0239458 | A1* | 10/2005 | Hurtta | H04W 8/18 455/432.1 |
| 2007/0104196 | A1* | 5/2007 | An | H04W 8/26 370/390 |
| 2008/0242264 | A1* | 10/2008 | Malik | G06F 21/31 455/411 |
| 2009/0247160 | A1* | 10/2009 | Muller | H04W 48/18 455/435.3 |
| 2009/0325641 | A1* | 12/2009 | Lee | H04L 63/0853 455/558 |
| 2010/0015949 | A1* | 1/2010 | Bradley | H04W 88/06 455/410 |
| 2011/0183646 | A1* | 7/2011 | Kramarz-vonkohout | H04L 63/10 455/411 |

FOREIGN PATENT DOCUMENTS

| | | | |
|---|---|---|---|
| CN | 1665335 | A | 9/2005 |
| CN | 1878209 | A | 12/2006 |
| CN | 101111028 | A | 1/2008 |
| CN | 101282578 | A | 10/2008 |
| CN | 101291542 | A | 10/2008 |
| CN | 100556197 | C | 10/2009 |
| CN | 101790012 | A | 7/2010 |
| CN | 101790159 | A | 7/2010 |
| CN | 101931829 | A | 12/2010 |
| CN | 101305631 | B | 2/2011 |
| CN | 101136962 | B | 6/2011 |
| CN | 101316441 | B | 3/2012 |
| CN | 102663584 | A | 9/2012 |
| CN | 102811420 | A | 12/2012 |
| CN | 202650076 | U | 1/2013 |
| CN | 102958037 | A * | 3/2013 |
| CN | 102118838 | B | 11/2013 |
| CN | 103686646 | A | 3/2014 |
| CN | 102572752 | B | 9/2014 |
| CN | 103024672 | B | 3/2015 |
| CN | 101998361 | B | 4/2015 |
| WO | WO 2006061532 | A1 * | 6/2006 ............. G01S 11/06 |

OTHER PUBLICATIONS

Machine Translation and Abstract of Chinese Publication No. CN102958037, Mar. 6, 2013, 11 pages.
Machine Translation and Abstract of Chinese Publication No. CN1878209, Dec. 13, 2006, 19 pages.
Machine Translation and Abstract of Chinese Publication No. CN2444351, Aug. 22, 2001, 4 pages.
Machine Translation and Abstract of Chinese Publication No. CN100556197, Oct. 28, 2009, 10 pages.
Machine Translation and Abstract of Chinese Publication No. CN101111028, Jan. 23, 2008, 6 pages.
Machine Translation and Abstract of Chinese Publication No. CN101136962, Jun. 8, 2011, 14 pages.
Machine Translation and Abstract of Chinese Publication No. CN101305631, Feb. 2, 2011, 18 pages.
Machine Translation and Abstract of Chinese Publication No. CN101316441, Mar. 14, 2012, 10 pages.
Machine Translation and Abstract of Chinese Publication No. CN101790012, Jul. 28, 2010, 9 pages.
Machine Translation and Abstract of Chinese Publication No. CN101790159, Jul. 28, 2010, 9 pages.
Machine Translation and Abstract of Chinese Publication No. CN101931829, Dec. 29, 2010, 10 pages.
Machine Translation and Abstract of Chinese Publication No. CN101998361, Apr. 15, 2015, 14 pages.
Machine Translation and Abstract of Chinese Publication No. CN102118838, Nov. 6, 2013, 11 pages.
Machine Translation and Abstract of Chinese Publication No. CN102572752, Sep. 17, 2014, 12 pages.
Machine Translation and Abstract of Chinese Publication No. CN102663584, Sep. 12, 2012, 17 pages.
Machine Translation and Abstract of Chinese Publication No. CN102811420, Dec. 5, 2012, 7 pages.
Machine Translation and Abstract of Chinese Publication No. CN103024672, Mar. 11, 2015, 8 pages.
Machine Translation and Abstract of Chinese Publication No. CN103686646, Mar. 26, 2014, 14 pages.
Machine Translation and Abstract of Chinese Publication No. CN202650076, Jan. 2, 2013, 14 pages.
Foreign Communication From a Counterpart Application, PCT Application No. PCT/CN2014/086824, English Translation of International Search Report dated Jun. 23, 2015, 2 pages.
Foreign Communication From a Counterpart Application, PCT Application No. PCT/CN2014/086824, English Translation of Written Opinion dated Jun. 23, 2015, 6 pages.

* cited by examiner

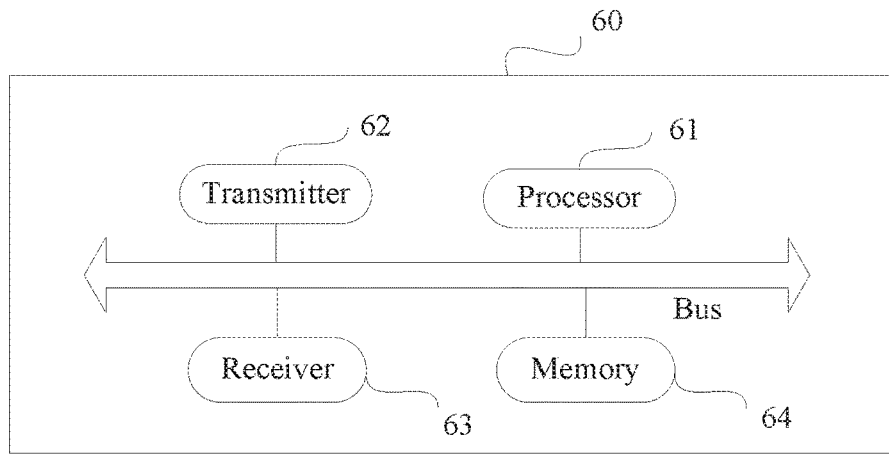

FIG. 6

| A server receives terminal roaming status request information sent by a terminal, where the terminal roaming status request information carries an MCC and an MNC that are corresponding to a SIM card in the terminal, and an MCC and an MNC that are of a terminal network currently accessed by the terminal | S71 |

| The server determines a roaming status of the terminal according to a correspondence between a country code, an MCC, an MNC, and an operator, and the terminal roaming status request information | S72 |

| The server sends, to the terminal, terminal roaming status response information that carries the roaming status of the terminal | S73 |

FIG. 7

METHOD AND APPARATUS FOR DETERMINING ROAMING STATUS OF TERMINAL, TERMINAL, AND SERVER

CROSS-REFERENCE TO RELATED APPLICATION

This application is a National Stage of International Patent Application No. PCT/CN2014/086824, filed Sep. 18, 2014, which is hereby incorporated by reference in its entirety.

TECHNICAL FIELD

The present disclosure relates to the roaming communications field, and in particular, to a method and an apparatus for determining a roaming status of a terminal, a terminal, and a server.

BACKGROUND

As a communication tool that people carry around, terminals such as a mobile phone generally have a roaming function. The roaming function means that a terminal can still perform communication when the terminal is not in a range of a home location or when the terminal accesses a network using another operator other than an operator to which the terminal belongs. A roaming status of a terminal includes international roaming, inter-operator roaming, and intra-operator roaming.

Currently, there is a method for determining a roaming status of a terminal. A terminal first obtains a Mobile Country Code (MCC) corresponding to a Subscriber Identity Module (SIM) card in the terminal and an MCC corresponding to a terminal network, then determines whether the two MCCs are the same, and if the two MCCs are the same, determines that the terminal is in intra-operator roaming. If the two MCCs are different, the terminal further determines whether an MCC set of a country in which the SIM card is located includes the MCC corresponding to the terminal network; if the MCC set of the country in which the SIM card is located includes the MCC of the terminal network, determines that the terminal is in inter-operator roaming; if the MCC set of the country in which the SIM card is located does not include the MCC corresponding to the terminal network, determines that the terminal is in international roaming.

However, the MCC cannot comprehensively reflect the roaming status of the terminal, and a result of determining the roaming status of the terminal using the foregoing solution may be inaccurate.

SUMMARY

Embodiments of the present invention provide a method and an apparatus for determining a roaming status of a terminal, a terminal, and a server, so as to improve accuracy in determining the roaming status of the terminal.

To achieve the foregoing objective, the following technical solutions are used in the embodiments of the present disclosure.

According to a first aspect, a method for determining a roaming status of a terminal is provided, including obtaining, by a terminal, an MCC and a mobile network code (MNC) that are corresponding to a SIM card in the terminal, and an MCC and an MNC that are corresponding to a terminal network currently accessed by the terminal; and determining, by the terminal, a roaming status of the terminal according to the MCC and the MNC that are corresponding to the SIM card, the MCC and the MNC that are corresponding to the terminal network, and a correspondence between a country code, an MCC, an MNC, and an operator.

With reference to the first aspect, in a first possible implementation manner of the first aspect, the determining, by the terminal, a roaming status of the terminal according to the MCC and the MNC that are corresponding to the SIM card, the MCC and the MNC that are corresponding to the terminal network, and a correspondence between a country code, an MCC, an MNC, and an operator includes, in a mode in which a roaming status of a terminal is computed in the cloud, sending, by the terminal, terminal roaming status request information to a server, where the terminal roaming status request information carries the MCC and the MNC that are corresponding to the SIM card, and the MCC and the MNC that are corresponding to the terminal network, and the terminal roaming status request information is used to request the server to determine the roaming status of the terminal according to the correspondence between a country code, an MCC, an MNC, and an operator; and receiving, by the terminal, terminal roaming status response information sent by the server, where the terminal roaming status response information carries the roaming status of the terminal, and the terminal roaming status response information is a response, of the server, to the terminal roaming status request information sent by the terminal.

With reference to the first aspect, in a second possible implementation manner of the first aspect, the determining, by the terminal, a roaming status of the terminal according to the MCC and the MNC that are corresponding to the SIM card, the MCC and the MNC that are corresponding to the terminal network, and a correspondence between a country code, an MCC, an MNC, and an operator includes, in a mode in which a roaming status of a terminal is computed locally, determining, by the terminal, the roaming status of the terminal according to the correspondence between a country code, an MCC, an MNC, and an operator, the MCC and the MNC that are corresponding to the SIM card, and the MCC and the MNC that are corresponding to the terminal network.

With reference to the second possible implementation manner of the first aspect, in a third possible implementation manner of the first aspect, the step of determining, by the terminal, the roaming status of the terminal according to the correspondence between a country code, an MCC, an MNC, and an operator, the MCC and the MNC that are corresponding to the SIM card, and the MCC and the MNC that are corresponding to the terminal network includes, according to the correspondence between a country code, an MCC, an MNC, and an operator, and the MCC corresponding to the SIM card, determining, by the terminal, a home country code corresponding to the SIM card, and determining an MCC set corresponding to the home country code; when the MCC corresponding to the terminal network does not belong to the MCC set corresponding to the home country code, determining, by the terminal, that the terminal is in an international roaming state; according to the correspondence between a country code, an MCC, an MNC, and an operator, and the MNC corresponding to the SIM card, determining, by the terminal, a home operator to which the SIM card belongs, and determining an MNC set corresponding to the home operator; when the MCC corresponding to the terminal network belongs to the MCC set corresponding to the home country code, and the MNC corresponding to the terminal network does not belong to the MNC set corresponding to the home operator, determining, by the terminal, that the terminal is in an inter-operator roaming state; and when the MCC corresponding to the terminal network belongs to the MCC set corresponding to the home country code, and the MNC corresponding to the terminal network belongs to the MNC set corresponding to the home operator, determining, by the terminal, that the terminal is in an intra-operator roaming state.

With reference to the second or the third possible implementation manner of the first aspect, in a fourth possible implementation manner of the first aspect, the method further includes, when the correspondence, stored in a server, between a country code, an MCC, an MNC, and an operator changes, receiving, by the terminal, a data update instruction sent by the server using a push server, where the data update instruction is a trigger instruction that triggers the terminal to update the correspondence, stored in the terminal, between a country code, an MCC, an MNC, and an operator; sending, by the terminal, a data request instruction to the server according to the data update instruction; and receiving, by the terminal, the changed correspondence sent by the server according to the data request instruction, and updating the correspondence stored in the terminal.

According to a second aspect, an apparatus for determining a roaming status of a terminal is provided, where the apparatus is applied to a terminal and includes an obtaining unit configured to obtain an MCC and an MNC that are corresponding to a SIM card in the terminal, and an MCC and an MNC that are corresponding to a terminal network currently accessed by the terminal; and a determining unit configured to determine a roaming status of the terminal according to the MCC and the MNC that are corresponding to the SIM card and that are obtained by the obtaining unit, the MCC and the MNC that are corresponding to the terminal network and that are obtained by the obtaining unit, and a correspondence between a country code, an MCC, an MNC, and an operator.

With reference to the second aspect, in a first possible implementation manner of the second aspect, in a mode in which a roaming status of a terminal is computed in the cloud, the determining unit includes a sending module configured to send terminal roaming status request information to a server, where the terminal roaming status request information carries the MCC and the MNC that are corresponding to the SIM card and that are obtained by the obtaining unit and the MCC and the MNC that are corresponding to the terminal network and that are obtained by the obtaining unit, and the terminal roaming status request information is used to request the server to determine the roaming status of the terminal according to the correspondence between a country code, an MCC, an MNC, and an operator; and a receiving module configured to receive terminal roaming status response information sent by the server, where the terminal roaming status response information carries the roaming status of the terminal, and the terminal roaming status response information is a response, of the server, to the terminal roaming status request information sent by the apparatus.

With reference to the second aspect, in a second possible implementation manner of the second aspect, in a mode in which a roaming status of a terminal is computed locally, the determining unit is configured to determine the roaming status of the terminal according to the correspondence between a country code of the terminal, an MCC, an MNC, and an operator, the MCC and the MNC that are corresponding to the SIM card, and the MCC and the MNC that are corresponding to the terminal network.

With reference to the second possible implementation manner of the second aspect, in a third possible implementation manner of the second aspect, the determining unit is configured to, according to the correspondence between a country code of the terminal, an MCC, an MNC, and an operator, and the MCC corresponding to the SIM card, determine a home country code corresponding to the SIM card, and determine an MCC set corresponding to the home country code; when the MCC corresponding to the terminal network does not belong to the MCC set corresponding to the home country code, determine that the terminal is in an international roaming state; according to the correspondence between a country code of the terminal, an MCC, an MNC, and an operator, and the MNC corresponding to the SIM card, determine a home operator to which the SIM card belongs, and determine an MNC set corresponding to the home operator; when the MCC corresponding to the terminal network belongs to the MCC set corresponding to the home country code, and the MNC corresponding to the terminal network does not belong to the MNC set corresponding to the home operator, determine that the terminal is in an inter-operator roaming state; and when the MCC corresponding to the terminal network belongs to the MCC set corresponding to the home country code, and the MNC corresponding to the terminal network belongs to the MNC set corresponding to the home operator, determine that the terminal is in an intra-operator roaming state.

With reference to the second or the third possible implementation manner of the second aspect, in a fourth possible implementation manner of the second aspect, the obtaining unit is further configured to, when the correspondence, stored in a server, between a country code, an MCC, an MNC, and an operator changes, receive a data update instruction sent by the server using a push server, where the data update instruction is a trigger instruction that triggers the terminal to update the correspondence, stored in the terminal, between a country code, an MCC, an MNC, and an operator; the apparatus further includes a sending unit configured to send a data request instruction to the server according to the data update instruction; the obtaining unit is further configured to receive the changed correspondence sent by the server according to the data request instruction; and the apparatus further includes an updating unit configured to update the correspondence stored in the terminal.

According to a third aspect, a terminal is provided, including a processor configured to obtain an MCC and an MNC that are corresponding to a SIM card in the terminal, and an MCC and an MNC that are corresponding to a terminal network currently accessed by the terminal; where the processor is further configured to determine a roaming status of the terminal according to the obtained MCC and MNC that are corresponding to the SIM card, the obtained MCC and MNC that are corresponding to the terminal network, and a correspondence between a country code, an MCC, an MNC, and an operator.

With reference to the third aspect, in a first possible implementation manner of the third aspect, in a mode in which a roaming status of a terminal is computed in the cloud, the terminal further includes a transmitter configured to send terminal roaming status request information to a server, where the terminal roaming status request information carries the MCC and the MNC that are corresponding to the SIM card and that are obtained by the processor and the MCC and the MNC that are corresponding to the terminal network and that are obtained by the processor, and the terminal roaming status request information is used to request the server to determine the roaming status of the terminal according to the correspondence between a country code, an MCC, an MNC, and an operator; and a receiver configured to receive terminal roaming status response information sent by the server, where the terminal roaming status response information carries the roaming status of the terminal, and the terminal roaming status response information is a response, of the server, to the terminal roaming status request information sent by the terminal.

With reference to the third aspect, in a second possible implementation manner of the third aspect, in a mode in which a roaming status of a terminal is computed locally, the processor is configured to determine the roaming status of the terminal according to the correspondence between a country code of the terminal, an MCC, an MNC, and an operator, the MCC and the MNC that are corresponding to the SIM card, and the MCC and the MNC that are corresponding to the terminal network.

With reference to the second possible implementation manner of the third aspect, in a third possible implementation manner of the third aspect, the processor is configured to, according to the correspondence between a country code of the terminal, an MCC, an MNC, and an operator, and the MCC corresponding to the SIM card, determine a home country code corresponding to the SIM card, and determine an MCC set corresponding to the home country code; when the MCC corresponding to the terminal network does not belong to the MCC set corresponding to the home country code, determine that the terminal is in an international roaming state; according to the correspondence between a country code of the terminal, an MCC, an MNC, and an operator, and the MNC corresponding to the SIM card, determine a home operator to which the SIM card belongs, and determine an MNC set corresponding to the home operator; when the MCC corresponding to the terminal network belongs to the MCC set corresponding to the home country code, and the MNC corresponding to the terminal network does not belong to the MNC set corresponding to the home operator, determine that the terminal is in an inter-operator roaming state; and when the MCC corresponding to the terminal network belongs to the MCC set corresponding to the home country code, and the MNC corresponding to the terminal network belongs to the MNC set corresponding to the home operator, determine that the terminal is in an intra-operator roaming state.

With reference to the second or the third possible implementation manner of the third aspect, in a fourth possible implementation manner of the third aspect, the terminal further includes a receiver configured to, when the correspondence, stored in a server, between a country code, an MCC, an MNC, and an operator changes, receive a data update instruction sent by the server using a push server, where the data update instruction is a trigger instruction that triggers the terminal to update the correspondence, stored in the terminal, between a country code, an MCC, an MNC, and an operator; and a transmitter configured to send a data request instruction to the server according to the data update instruction, where the receiver is further configured to receive the changed correspondence sent by the server according to the data request instruction; and the processor is further configured to update the correspondence stored in the terminal.

According to a fourth aspect, a method for determining a roaming status of a terminal is provided, including receiving, by a server, terminal roaming status request information sent by a terminal, where the terminal roaming status request information carries an MCC and an MNC that are corresponding to a SIM card in the terminal, and an MCC and an MNC that are of a terminal network currently accessed by the terminal; determining, by the server, a roaming status of the terminal according to a correspondence between a country code, an MCC, an MNC, and an operator, and the terminal roaming status request information; and sending, to the terminal by the server, terminal roaming status response information that carries the roaming status of the terminal, where the terminal roaming status response information is a response, of the server, to the terminal roaming status request information sent by the terminal.

With reference to the fourth aspect, in a first possible implementation manner of the fourth aspect, the step of determining, by the server, a roaming status of the terminal according to a correspondence between a country code, an MCC, an MNC, and an operator and the terminal roaming status request information includes, according to the correspondence between a country code, an MCC, an MNC, and an operator, and the MCC that is corresponding to the SIM card and that is carried in the terminal roaming status request information, determining, by the server, a home country code corresponding to the SIM card, and determining an MCC set corresponding to the home country code; when the MCC corresponding to the terminal network does not belong to the MCC set corresponding to the home country code, determining, by the server, that the terminal is in an international roaming state; according to the correspondence between a country code, an MCC, an MNC, and an operator, and the MNC corresponding to the SIM card, determining, by the server, a home operator to which the SIM card belongs, and determining an MNC set corresponding to the home operator; when the MCC corresponding to the terminal network belongs to the MCC set corresponding to the home country code, and the MNC corresponding to the terminal network does not belong to the MNC set corresponding to the home operator, determining, by the server, that the terminal is in an inter-operator roaming state; and when the MCC corresponding to the terminal network belongs to the MCC set corresponding to the home country code, and the MNC corresponding to the terminal network belongs to the MNC set corresponding to the home operator, determining, by the server, that the terminal is in an intra-operator roaming state.

With reference to the fourth aspect or the first possible implementation manner of the fourth aspect, in a second possible implementation manner of the fourth aspect, when the terminal is in a mode in which a roaming status of a terminal is computed locally, the method further includes, when the correspondence, stored in the server, between a country code, an MCC, an MNC, and an operator changes, sending, by the server, a data update instruction to the terminal using a push server, where the data update instruction is a trigger instruction that triggers the terminal to update the correspondence, stored in the terminal, between a country code, an MCC, an MNC, and an operator; receiving, by the server, a data request instruction sent by the terminal according to the data update instruction; and sending, by the server, the changed correspondence to the terminal according to the data request instruction, so that the terminal updates the correspondence stored in the terminal.

According to a fifth aspect, an apparatus for determining a roaming status of a terminal is provided, where the apparatus is applied to a server and includes a receiving unit configured to receive terminal roaming status request information sent by a terminal, where the terminal roaming status request information carries an MCC and an MNC that are corresponding to a SIM card in the terminal, and an MCC and an MNC that are of a terminal network currently accessed by the terminal; a determining unit configured to determine a roaming status of the terminal according to a correspondence between a country code, an MCC, an MNC, and an operator, and the terminal roaming status request information received by the receiving unit; and a sending unit configured to send, to the terminal, terminal roaming status response information that carries the roaming status, determined by the determining unit, of the terminal, where the terminal roaming status response information is a response, of the apparatus, to the terminal roaming status request information sent by the terminal.

With reference to the fifth aspect, in a first possible implementation manner of the fifth aspect, the determining unit is configured to, according to the correspondence between a country code, an MCC, an MNC, and an operator, and the MCC that is corresponding to the SIM card and that is carried in the terminal roaming status request information, determine a home country code corresponding to the SIM card, and determine an MCC set corresponding to the home country code; when the MCC corresponding to the terminal network does not belong to the MCC set corresponding to the home country code, determine that the terminal is in an international roaming state; according to the correspondence between a country code, an MCC, an MNC, and an operator, and the MNC corresponding to the SIM card, determine a home operator to which the SIM card belongs, and determine an MNC set corresponding to the home operator; when the MCC corresponding to the terminal network belongs to the MCC set corresponding to the home country code, and the MNC corresponding to the terminal network does not belong to the MNC set corresponding to the home operator, determine that the terminal is in an inter-operator roaming state; and when the MCC corresponding to the terminal network belongs to the MCC set corresponding to the home country code, and the MNC corresponding to the terminal network belongs to the MNC set corresponding to the home operator, determine that the terminal is in an intra-operator roaming state.

With reference to the fifth aspect or the first possible implementation manner of the fifth aspect, in a second possible implementation manner of the fifth aspect, when the terminal is in a mode in which a roaming status of a terminal is computed locally, the sending unit is further configured to, when the correspondence, stored in the server, between a country code, an MCC, an MNC, and an operator changes, send a data update instruction to the terminal using a push server, where the data update instruction is a trigger instruction that triggers the terminal to update the correspondence, stored in the terminal, between a country code, an MCC, an MNC, and an operator; the receiving unit is further configured to receive a data request instruction sent by the terminal according to the data update instruction; and the sending unit is further configured to send the changed correspondence to the terminal according to the data request instruction, so that the terminal updates the correspondence stored in the terminal.

According to a sixth aspect, a server is provided, including a receiver configured to receive terminal roaming status request information sent by a terminal, where the terminal roaming status request information carries an MCC and an MNC that are corresponding to a SIM card in the terminal, and an MCC and an MNC that are of a terminal network currently accessed by the terminal; a processor configured to determine a roaming status of the terminal according to a correspondence between a country code, an MCC, an MNC, and an operator, and the terminal roaming status request information received by the receiver; and a transmitter configured to send, to the terminal, terminal roaming status response information that carries the roaming status, determined by the processor, of the terminal, where the terminal roaming status response information is a response, of the server, to the terminal roaming status request information sent by the terminal.

With reference to the sixth aspect, in a first possible implementation manner of the sixth aspect, the processor is configured to, according to the correspondence between a country code, an MCC, an MNC, and an operator, and the MCC that is corresponding to the SIM card and that is carried in the terminal roaming status request information, determine a home country code corresponding to the SIM card, and determine an MCC set corresponding to the home country code; when the MCC corresponding to the terminal network does not belong to the MCC set corresponding to the home country code, determine that the terminal is in an international roaming state; according to the correspondence between a country code, an MCC, an MNC, and an operator, and the MNC corresponding to the SIM card, determine a home operator to which the SIM card belongs, and determine an MNC set corresponding to the home operator; when the MCC corresponding to the terminal network belongs to the MCC set corresponding to the home country code, and the MNC corresponding to the terminal network does not belong to the MNC set corresponding to the home operator, determine that the terminal is in an inter-operator roaming state; and when the MCC corresponding to the terminal network belongs to the MCC set corresponding to the home country code, and the MNC corresponding to the terminal network belongs to the MNC set corresponding to the home operator, determine that the terminal is in an intra-operator roaming state.

With reference to the sixth aspect or the first possible implementation manner of the sixth aspect, in a second possible implementation manner of the sixth aspect, when the terminal is in a mode in which a roaming status of a terminal is computed locally, the transmitter is further configured to, when the correspondence, stored in the server, between a country code, an MCC, an MNC, and an operator changes, send a data update instruction to the terminal using a push server, where the data update instruction is a trigger instruction that triggers the terminal to update the correspondence, stored in the terminal, between a country code, an MCC, an MNC, and an operator; the receiver is further configured to receive a data request instruction sent by the terminal according to the data update instruction; and the transmitter is further configured to send the changed correspondence to the terminal according to the data request instruction, so that the terminal updates the correspondence stored in the terminal.

In the method and the apparatus for determining a roaming status of a terminal, the terminal, and the server provided in the embodiments of the present disclosure, a terminal obtains an MCC and an MNC that are corresponding to a SIM card in the terminal, and an MCC and an MNC that are corresponding to a terminal network in which the terminal is currently located, and determines a roaming status of the terminal according to a correspondence between a country code, an MCC, an MNC, and an operator. In the using, only an MCC is used to determine a roaming status, and therefore, a result of the determining is not accurate enough. By contrast, in the method and the like provided in the embodiments of the present disclosure, factors such as the MCCs and the MNCs that are corresponding to the SIM card and the terminal network, and the correspondence between a country code, an MCC, an MNC, and an operator are comprehensively considered, and these factors can comprehensively reflect features of different roaming states, so that accuracy in determining the roaming status of the terminal can be improved.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show merely some embodiments of the present disclosure, and persons of ordinary skill in the art may still derive other drawings from these accompanying drawings without creative efforts.

FIG. 6 is a schematic structural diagram of a terminal according to Embodiment 6;

FIG. 7 is a flowchart of a method for determining a roaming status of a terminal according to Embodiment 7;

DESCRIPTION OF EMBODIMENTS

Figure 1:
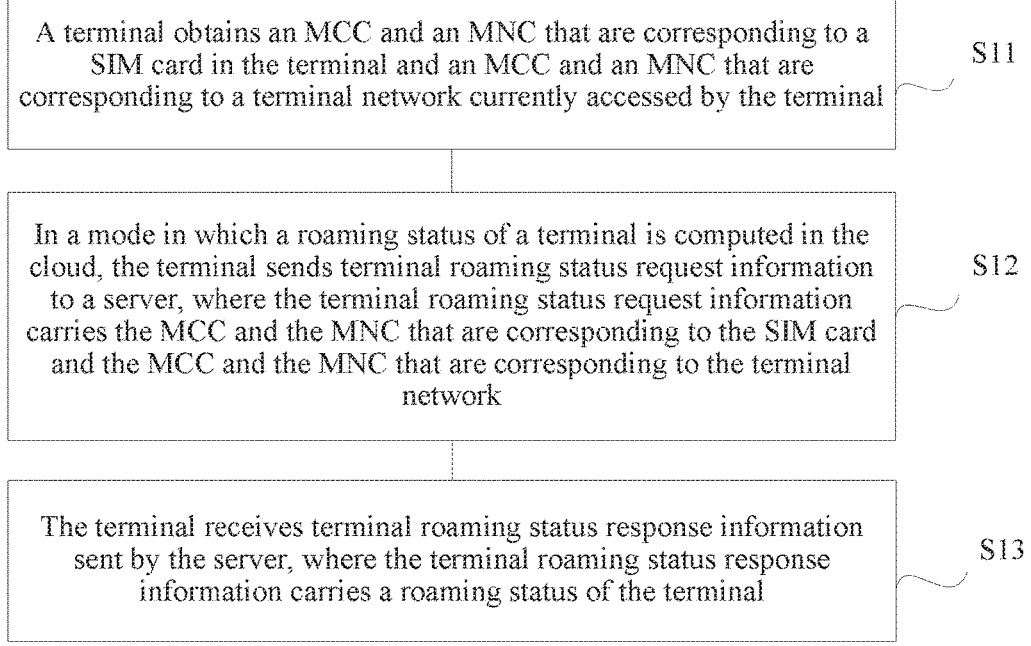
FIG. 1 is a flowchart of a method for determining a roaming status of a terminal according to Embodiment 1.

In the following embodiments, international roaming means that a terminal (and a SIM card in the terminal) leaves a range of a home location, and accesses a network using an operator beyond the range of the home location and performs communication. Inter-operator roaming means that a terminal accesses a network within a range of a home location by using another operator other than an operator to which the terminal belongs and performs communication. Intra-operator roaming means that a terminal accesses a network within a range of a home location using an operator to which the terminal belongs and performs communication.

After analyzing the prior art, the inventor finds that when a roaming status of a terminal is determined using an MCC corresponding to a SIM card and an MCC corresponding to a terminal network, because different operators may be corresponding to a same MCC and a same operator may be corresponding to multiple different MCCs, that is, an operator and an MCC are not in a one-to-one correspondence, an operator to which the SIM card subscribes and an operator to which the terminal network belongs cannot be determined only using the MCC corresponding to the SIM card and the MCC corresponding to the terminal network. Accuracy in determining the roaming status of the terminal is relatively low.

For example, when the roaming status of the terminal is determined using the MCC corresponding to the SIM card and the MCC corresponding to the terminal network, because different operators may be corresponding to a same MCC, when the MCC corresponding to the SIM card is the same as the MCC corresponding to the terminal network, the terminal is in an inter-operator roaming state. In addition, because a same operator may be corresponding to multiple different MCCs, when the MCC corresponding to the SIM card is different from the MCC corresponding to the terminal network, the terminal is in an intra-operator roaming state.

To resolve the problem in the prior art, the inventor proposes a method for determining a roaming status of a terminal. The method includes obtaining, by a terminal, an MCC and an MNC that are corresponding to a SIM card in the terminal, and an MCC and an MNC that are corresponding to a terminal network currently accessed by the terminal; and then determining, by the terminal, a roaming status of the terminal according to the MCC and the MNC that are corresponding to the SIM card, the MCC and the MNC that are corresponding to the terminal network, and a correspondence between a country code, an MCC, an MNC, and an operator. In the prior art, only an MCC is used to determine a roaming status, and therefore, a result of the determining is not accurate enough. By contrast, in the foregoing method, factors such as the MCCs and the MNCs that are corresponding to the SIM card and the terminal network, and the correspondence between a country code, an MCC, an MNC, and an operator are comprehensively considered, and these factors can comprehensively reflect features of different roaming states, so that accuracy in determining the roaming status of the terminal can be improved.

For the terminal, when the roaming status of the terminal is determined, a mode in which a roaming status of a terminal is computed in the cloud or a mode in which a roaming status of a terminal is computed locally may be selected. The mode in which a roaming status of a terminal is computed in the cloud refers to a mode in which a server in the cloud receives an MCC and an MNC that are corresponding to a SIM card and that are sent by a terminal and an MCC and an MNC that are corresponding to a terminal network currently accessed by the terminal and that are sent by the terminal, computes the roaming status of the terminal according to a correspondence, stored in the server, between a country code, an MCC, an MNC, and an operator, and sends the roaming status obtained by means of computation to the terminal. Correspondingly, the mode in which a roaming status of a terminal is computed locally refers to a mode in which after obtaining an MCC and an MNC that are corresponding to a SIM card and an MCC and an MNC that are corresponding to a terminal network currently accessed by a terminal, the terminal computes a roaming status of the terminal according to a correspondence, stored in the terminal, between a country code, an MCC, an MNC, and an operator.

To differentiate between the mode in which a roaming status of a terminal is computed in the cloud and the mode in which a roaming status of a terminal is computed locally, the following clearly and completely describes the technical solutions in the embodiments of the present disclosure with reference to the accompanying drawings in the embodiments of the present disclosure. The described embodiments are merely some rather than all of the embodiments of the present disclosure. All other embodiments obtained by persons of ordinary skill in the art based on the embodiments of the present disclosure without creative efforts shall fall within the protection scope of the present disclosure.

Embodiment 1

Embodiment 1 provides a method for determining a roaming status of a terminal. The method may be executed by a terminal. For instance, the method may be executed by a terminal on which a framework interface module is disposed in advance. The framework interface module may be invoked by a service module (that is, a module for executing a specific service) at an application layer to determine a roaming status of the terminal. As shown in FIG. 1, the method includes the following steps.

S11. A terminal obtains an MCC and an MNC that are corresponding to a SIM card in the terminal, and an MCC and an MNC that are corresponding to a terminal network currently accessed by the terminal.

When a requirement for obtaining the roaming status of the terminal is triggered, for example, when the terminal executes a specific service if a roaming status detection function is enabled to trigger a request for a roaming status, to determine the roaming status of the terminal, information about a home location of the terminal and an operator to which the terminal belongs may be first obtained. For example, to determine a country or a region in which the terminal is located during subscription, the terminal may obtain the MCC corresponding to the SIM card in the terminal, and to determine a communications operator to which the terminal subscribes, the terminal may obtain the MNC corresponding to the SIM card in the terminal. Because the MCC and the MNC that are corresponding to the SIM card are recorded in the SIM card, the framework interface module may directly read the MCC and the MNC from the SIM card. In addition, the network currently accessed by the terminal further needs to be obtained, that is, information about a country or a region in which the terminal network is located and an operator that operates the terminal network further needs to be obtained. The terminal obtains the MCC and the MNC that are corresponding to the terminal network. In a process of accessing the terminal network, the terminal may interact with a network side using a mobile network module to determine the MCC and the MNC that are corresponding to the terminal network. Therefore, the framework interface module obtains the MCC and the MNC that are corresponding to the terminal network.

For example, the terminal subscribes to a communications operator in the United States and roams to a terminal network of a communications operator in China. An MCC that is corresponding to a SIM card in the terminal and that is obtained by the terminal may be 310, an MNC may be 066, an obtained MCC corresponding to a terminal network may be 460, and an MNC may be 00.

S12. In a mode in which a roaming status of a terminal is computed in the cloud, the terminal sends terminal roaming status request information to a server, where the terminal roaming status request information carries the MCC and the MNC that are corresponding to the SIM card, and the MCC and the MNC that are corresponding to the terminal network.

The roaming status of the terminal may be computed in the cloud, or may be locally computed by the terminal. The terminal may voluntarily select the cloud computing mode or the local computing mode according to different service requirements. For example, when a service requires relatively high accuracy of the roaming status of the terminal, for example, in application scenarios of services such as a short message service and voice that involve a communication tariff, the terminal may select the cloud computing mode; when a service requires slightly low accuracy of the roaming status of the terminal, for example, in a scenario in which a communication tariff is not involved and a subscriber simply wants to learn a roaming status, the terminal may select the local computing mode. Alternatively, a computing mode is selected according to a status of a current network. For example, when the terminal is in an offline state, the local computing mode is selected; when the terminal is in an online state, the cloud computing mode is selected. Alternatively, a computing mode may be preset. For example, the cloud computing mode is enabled or disabled in advance. This embodiment is used to describe the mode in which a roaming status of a terminal is computed in the cloud.

After the terminal separately obtains two groups of MCCs and MNCs according to step S11, to request the roaming status of the terminal, the terminal sends the terminal roaming status request information to the server, where the terminal roaming status request information is used to request the server to determine the roaming status of the terminal according to the correspondence between a country code, an MCC, an MNC, and an operator, and the terminal roaming status request information is a bottom-layer (relative to the application layer at which an application program is located) message that is self-defined based on the framework interface module and needs to carry the MCC and the MNC that are corresponding to the SIM card and the MCC and the MNC that are corresponding to the terminal network, so that the server computes the roaming status of the terminal according to the terminal roaming status request information.

On a server side, the server needs to use the correspondence between a country code, an MCC, an MNC, and an operator when performing a logical operation. A country code (or a country code) is a group of geographical codes used to represent a country or a region. The country code is a short digit string that includes letters or digits and is convenient for use in data processing and communication. For example, a country code of China is CN, and a country code of the United States is US. One country code may be corresponding to multiple MCCs. For example, US may be corresponding to 310 and 311. An operator is a communications operator of a terminal network. Operators in China include China, China Unicom, and China Telecom. Operators in the United States include American Telephone and Telegraph Corporation (AT&T Mobility), U.S. Cellular, and the like. One operator may also be corresponding to multiple MNCs. For example, AT&T Mobility is corresponding to 090 and 410. The correspondence between a country code, an MCC, an MNC, and an operator refers to, for example, a correspondence between CN, 460, 00, and China Mobile, or a correspondence between US, 310, 090, and AT&T Mobility.

The server may compute the roaming status of the terminal according to the correspondence between a country code, an MCC, an MNC, and an operator, and the terminal roaming status request information. A specific computing manner is described in the following embodiment.

S13. The terminal receives terminal roaming status response information sent by the server, where the terminal roaming status response information carries a roaming status of the terminal.

After determining the roaming status of the terminal by performing computation according to the received terminal roaming status request information, the server sends, using the terminal roaming status response information, the roaming state that is of the terminal and that is obtained by means of computation to the terminal, where the terminal roaming status response information is a response, of the server, to the terminal roaming status request information sent by the terminal. In this way, the terminal can determine the roaming status of the terminal, and perform corresponding processing according to the roaming status. For example, the terminal displays a current roaming status, to notify the subscriber that a roaming tariff may be generated in using a service. Corresponding to the terminal roaming status request information, the terminal roaming status response information is also a bottom-layer message that is self-defined based on the framework interface module.

It may be learned from the foregoing description that, in the method for determining a roaming status of a terminal provided in Embodiment 1, a terminal obtains an MCC and an MNC that are corresponding to a SIM card in the terminal, and an MCC and an MNC that are corresponding to a terminal network in which the terminal is currently located, and sends the foregoing information to a server using terminal roaming status request information. Because the server stores a complete, comprehensive, and latest correspondence between a country code, an MCC, an MNC, and an operator, the server can compute an accurate roaming status according to the correspondence. In the prior art, only an MCC is used to determine a roaming status, and therefore, a result of the determining is not accurate enough. By contrast, in the method provided in Embodiment 1 of the present disclosure, factors such as the MCCs and the MNCs that are corresponding to the SIM card and the terminal network, and the correspondence between a country code, an MCC, an MNC, and an operator are comprehensively considered, and these factors can comprehensively reflect features of different roaming states, so that accuracy in determining the roaming status of the terminal can be improved.

In addition, in the prior art, for example, a standard application programming interface (API) of a terminal such as an ANDROID system mobile phone does not provide a standard interface for invoking by a service module to directly determine a roaming status of the terminal. Moreover, the MCC of the SIM card and the MCC of the terminal network are bottom-layer configuration information. In the previous technology, when developing a specific application, a developer needs to design the application, so that information about these MCCs and a relationship between the information about these MCCs and a roaming action of the terminal can be obtained from a terminal management module. This is relatively complicated for a developer at an application layer. However, a framework interface module involved in the present disclosure is an improvement made at a bottom layer of an operating system. The framework interface module serves as a standard interface module for the service module to obtain the roaming status of the terminal. Even a developer at the application layer who does not know the bottom layer of the operating system can obtain the roaming status of the terminal by invoking the standard interface module, so that development work of the developer at the application layer can be simplified and a service of obtaining the roaming status of the terminal can be easily embedded in another service.

Embodiment 2

Embodiment 2 is used to describe a specific manner of computing a roaming status of a terminal by a server in a cloud computing mode or by a terminal in a local computing mode. Because specific computing manners are the same, the local computing mode is used as an example for description herein.

In a mode in which a roaming status of a terminal is computed locally, after the foregoing step S11 in which a terminal obtains an MCC and an MNC that are corresponding to a SIM card in the terminal, and an MCC and an MNC that are corresponding to a terminal network currently accessed by the terminal, the terminal may determine a roaming status of the terminal according to a correspondence between a country code, an MCC, an MNC, and an operator, the MCC and the MNC that are corresponding to the SIM card, and the MCC and the MNC that are corresponding to the terminal network. For example, the terminal reads the latest foregoing correspondence from a data storage memory, where formats of some correspondences are listed in the following table.

TABLE 1

Examples of some correspondences

| Serial number | Country code | MCC | MNC | Operator name |
|---|---|---|---|---|
| 1 | CN | 460 | 00 | China Mobile |
| 2 | CN | 460 | 01 | China Unicom |
| 3 | CN | 460 | 02 | China Mobile |
| 4 | CN | 460 | 03 | China Telecom |
| 5 | CN | 460 | 05 | China Telecom |
| 6 | US | 310 | 090 | American Telephone and Telegraph Corporation |
| 7 | US | 310 | 410 | American Telephone and Telegraph Corporation |
| 8 | US | 310 | 066 | U.S. Cellular |
| 9 | US | 311 | 220 | U.S. Cellular |

Then, the terminal may refer to the foregoing correspondences according to the MCC and the MNC that are corresponding to the SIM card in the terminal and the MCC and the MNC that are corresponding to the terminal network, and according to three determining conditions: different country codes indicate international roaming, a same country code but different operators indicate inter-operator roaming, and a same country code and a same operator indicate intra-operator roaming, to determine the roaming status of the terminal.

Figure 2A:
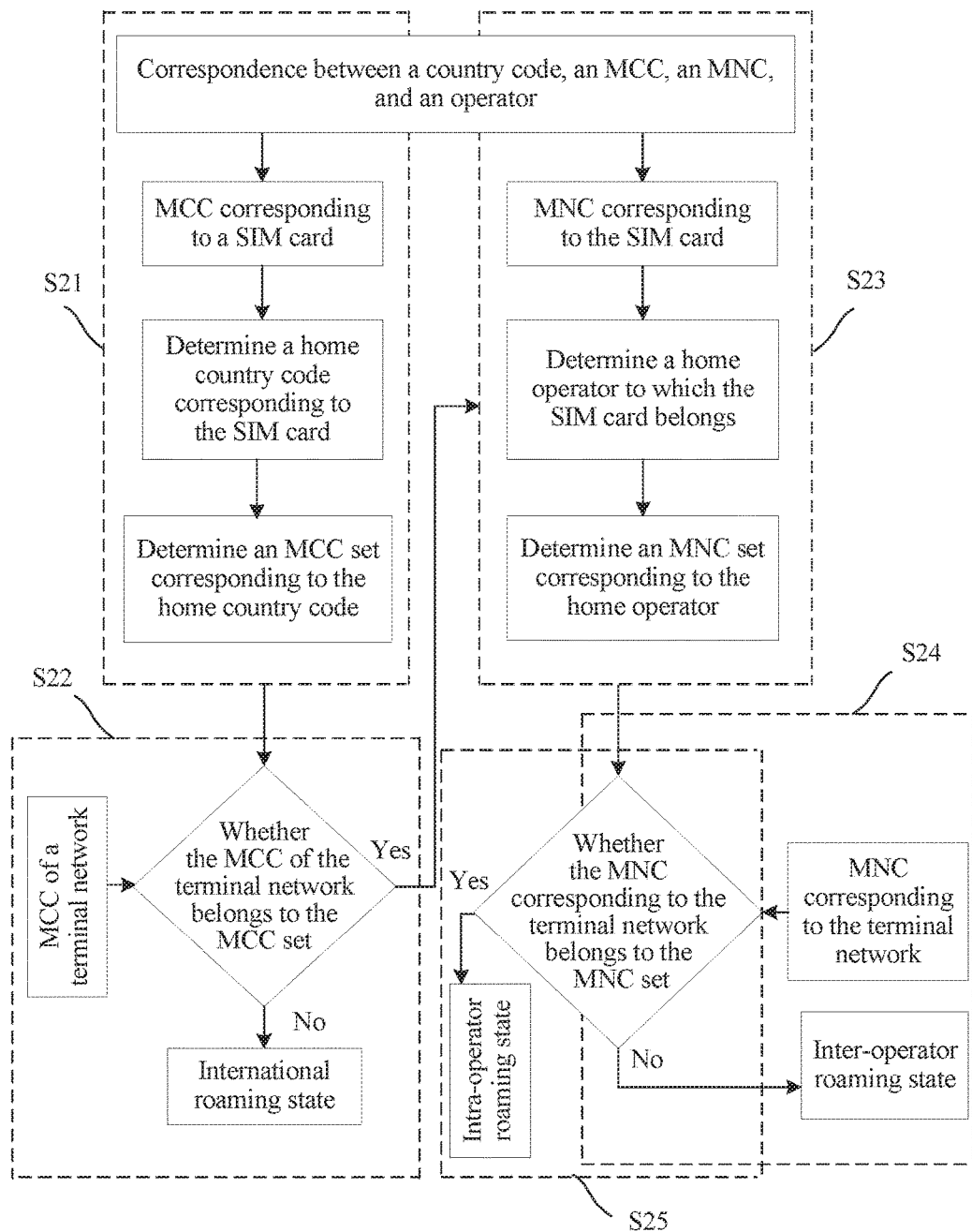
FIG. 2A is an alternative flowchart of a method for determining a roaming status of a terminal according to Embodiment 2.

The following determining method is provided. In the method, it is set that the terminal subscribes to and is registered in the communications operator U.S. Cellular in the United States, and the MCC corresponding to the SIM card in the terminal is 310, and the MNC is 066. As shown in FIG. 2, the method includes the following steps.

S21. According to a correspondence between a country code, an MCC, an MNC, and an operator, and an MCC corresponding to a SIM card, a terminal determines a home country code corresponding to the SIM card, and determines an MCC set corresponding to the home country code.

In this step, the MCC that is of the SIM card in the terminal and that is obtained by the terminal is 310. It may be learned by querying Table 1 (line 6 to line 8) that, a home country code corresponding to the SIM card whose MCC is 310 is US. That is, it may be determined that a country or a region in which the terminal subscribes is the United States US. According to the home country code US corresponding to the SIM card, a set that includes line 6 to line 9 (serial numbers are 6 to 9) may be determined, where the home country code US is corresponding to MCCs 310 and 311, and the set is an MCC set corresponding to the home country code US. In addition to this set, a set whose country code is not US may also be determined, that is, a set that includes line 1 to line 5. Although the table shows only four lines of correspondences in cases in which home county codes are US, the MCC set corresponding to the home country code US further includes another correspondence corresponding to the home country code US. Although the table shows only two country codes: US and CN, the correspondence may include other country codes such as JP (Japan) and KR (Korea).

S22. When an MCC corresponding to a terminal network does not belong to the MCC set corresponding to the home country code, determine that the terminal is in an international roaming state.

In this step, it is assumed that the terminal roams from the United States to China and accesses a terminal network operated by an operator in China, and an MCC corresponding to the terminal network currently accessed by the terminal is 460. Because the MCC 460 does not belong to the MCC set (line 6 to line 9 in Table 1) that is corresponding to the home country code US and that is determined according to step S21, it is determined that the terminal is in the international roaming state. Certainly, further, it may be first determined, according to the MCC 460, that a country code is CN. Because the country code is CN rather than US, it is determined that the terminal is in the international roaming state.

S23. According to the correspondence between a country code, an MCC, an MNC, and an operator, and an MNC corresponding to the SIM card, the terminal determines a home operator to which the SIM card belongs, and determines an MNC set corresponding to the home operator.

In this step, the MNC that is corresponding to the SIM card in the terminal and that is obtained by the terminal is 066. It may be learned by querying Table 1 (line 8) that, a home operator to which the SIM card whose MNC is 066 belongs is U.S. Cellular, so that it may be determined that an operator to which the SIM card of the terminal subscribes and in which the SIM card of the terminal is registered is U.S. Cellular. A set that includes line 8 and line 9 may be determined according to the home operator U.S. Cellular to which the SIM card belongs, where the home operator U.S. Cellular is corresponding to MNCs 066 and 220, and the set is an MNC set corresponding to the home operator U.S. Cellular.

S24. When the MCC corresponding to the terminal network belongs to the MCC set corresponding to the foregoing home country code, and an MNC corresponding to the terminal network does not belong to the MNC set corresponding to the home operator, determine that the terminal is in an inter-operator roaming state.

In this step, it is assumed that the terminal is still within a range of the United States, the MCC corresponding to the terminal network currently accessed by the terminal is 310, and it is assumed that the terminal performs inter-operator roaming, and the MNC corresponding to the terminal network currently accessed by the terminal is 090. Because the MCC 310 belongs to the MCC set (line 6 to line 9 in Table 1) that is corresponding to the home country code US and that is determined according to step S21, and the MNC 090 does not belong to the MNC set (line 8 and line 9 in Table 1) that is corresponding to the home operator U.S. Cellular and that is determined according to step S23, it is determined that the terminal is in the inter-operator roaming state. Certainly, after it is determined that the terminal is not in the international roaming state, it may further be determined, according to the MNC 090, that an operator is AT&T Mobility. Because the operator is AT&T Mobility rather than U.S. Cellular, it is determined that the terminal is in the inter-operator roaming state.

S25. When the MCC corresponding to the terminal network belongs to the MCC set corresponding to the home country code, and the MNC corresponding to the terminal network belongs to the MNC set corresponding to the home operator, determine that the terminal is in an intra-operator roaming state.

In this step, it is assumed that the terminal is still within the range of the United States, the MCC corresponding to the terminal network currently accessed by the terminal is 310 or 311. In addition, the MNC corresponding to the terminal network currently accessed by the terminal is 066 or 220. Because the MCC 310 or the MCC 311 belongs to the MCC set (line 6 to line 9 in Table 1) that is corresponding to the home country code US and that is determined according to step S21, and the MNC 066 or the MNC 220 belongs to the MNC set (line 8 to line 9 in Table 1) that is corresponding to the home operator U.S. Cellular and that is determined according to step S23, it is determined that the terminal is in the intra-operator roaming state. Certainly, after it is determined that the terminal is not in the international roaming state, it may further be determined, according to the MNC 066 or the MNC 220, that an operator is U.S. Cellular. Because the operator to which the operator subscribes and in which the operator is registered is exactly U.S. Cellular, it is determined that the terminal is in the intra-operator roaming state.

In Embodiment 2, in a cloud computing mode, a server stores a complete, comprehensive, and latest correspondence between a country code, an MCC, an MNC, and an operator; or in a local computing mode, a terminal also stores a complete, comprehensive, and relatively new foregoing correspondence. In addition, when a roaming status is being computed, factors such as MCCs and MNCs that are corresponding to a SIM card and a terminal network and the foregoing correspondence are comprehensively considered, and these factors can comprehensively reflect features of different roaming states. Moreover, a manner of determining a roaming status of the terminal according to sets is used in this embodiment, and there is no intersection set between the sets. Therefore, accuracy in determining the roaming status of the terminal can be improved. In addition, because the sets can be determined using a simple algorithm, determining the roaming status of the terminal becomes easy.

Figure 2B:
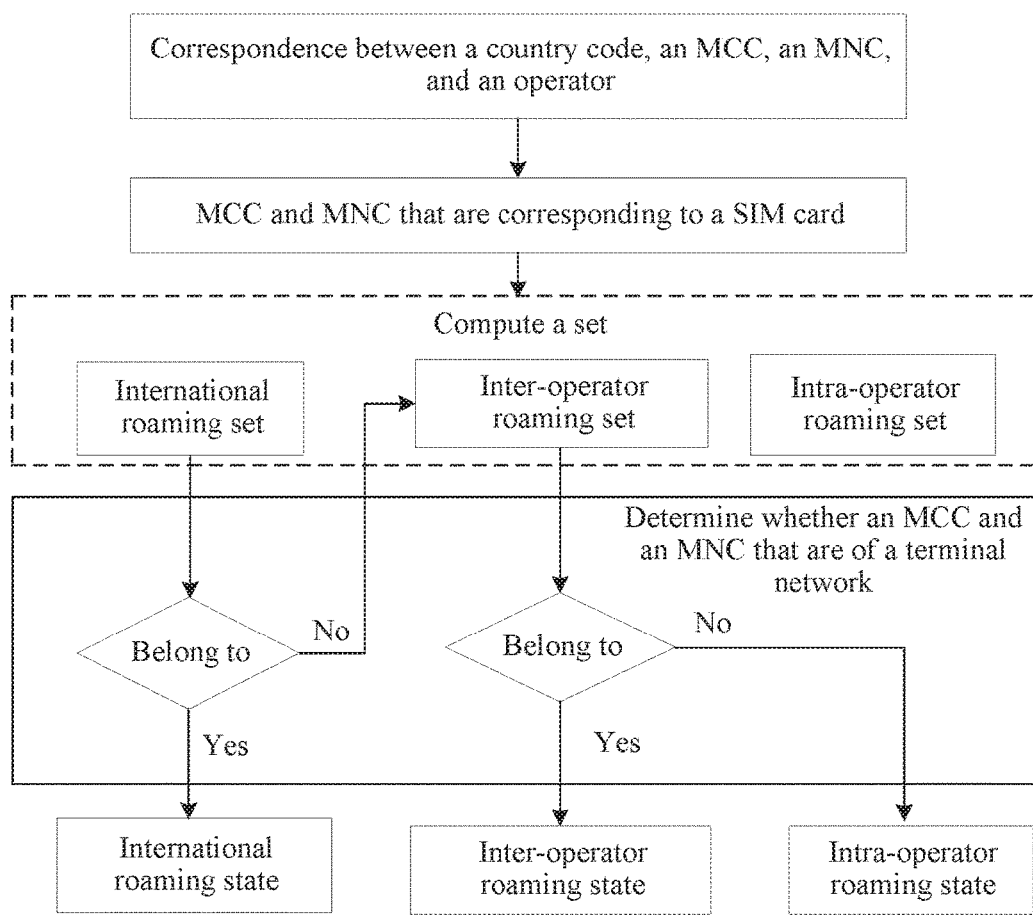
FIG. 2B is an alternative flowchart of a method for determining a roaming status of a terminal according to a transformed embodiment of Embodiment 2.

As shown in FIG. 2B, in addition to the foregoing computing manners, in a transformed embodiment of Embodiment 2, further, three sets that are used to determine the roaming status of the terminal: an international roaming set, an inter-operator roaming set, and an intra-operator roaming set may be first determined according to the MCC and the MNC that are corresponding to the SIM card in the terminal and the correspondence between a country code, an MCC, an MNC, and an operator. Then, which of the foregoing three sets to which the MCC and the MNC of the terminal network belong is determined. When the MCC and the MNC of the terminal network belong to one of the foregoing three sets, it is determined that the roaming status of the terminal is a roaming state corresponding to the set.

In this embodiment, it is still set that the terminal subscribes to and is registered in the communications operator U.S. Cellular in the United States, and the MCC corresponding to the SIM card in the terminal is 310, and the MNC is 066. Reference is made to Table 1 in the following for description.

The MCC corresponding to the SIM card is 310, and accordingly, it is determined that the home country code corresponding to the SIM card is US, and correspondences (line 1 to line 5 in Table 1) in cases in which country codes are not US are used as an international roaming set. If the MCC and the MNC that are corresponding to the terminal network belong to this set, for example, the MCC is 460 and the MNC is 00, it is determined that the roaming status of the terminal is the international roaming state.

The MNC corresponding to the SIM card is 066, and accordingly, it is determined that the home operator corresponding to the SIM card is U.S. Cellular, and correspondences (line 6 and line 7 in Table 1) in cases in which country codes are not US and operators are not U.S. Cellular are used as an inter-operator roaming set. If the MCC and the MNC that are corresponding to the terminal network belong to this set, for example, the MCC is 310 and the MNC is 090, it is determined that the roaming status of the terminal is the inter-operator roaming state.

The MNC corresponding to the SIM card is 066, and accordingly, it is determined that the home operator corresponding to the SIM card is U.S. Cellular, and correspondences (line 8 and line 9 in Table 1) in cases in which country codes are not US and operators are U.S. Cellular are used as an intra-operator roaming set. If the MCC and the MNC that are corresponding to the terminal network belong to this set, for example, the MCC is 311 and the MNC is 220, it is determined that the roaming status of the terminal is the intra-operator roaming state.

It should be noted that, in Embodiment 2 and the transformed embodiment of Embodiment 2, a sequence of determining the three sets and a sequence of determining roaming states corresponding to the three sets are not definite, and whether all of the three sets need to be computed is not definite either, which may be independently selected by an executor according to a practical requirement.

Embodiment 3

Figure 3:
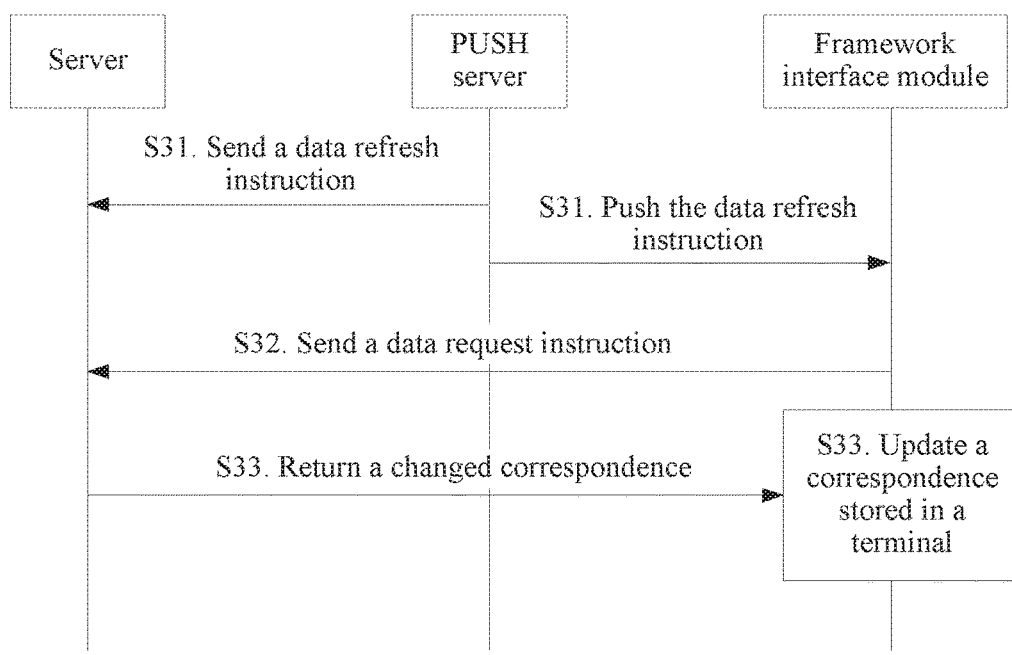
FIG. 3 is a flowchart that is further included in a method for determining a roaming status of a terminal according to Embodiment 3 in a mode in which the roaming status of the terminal is computed locally.
Figure 4:
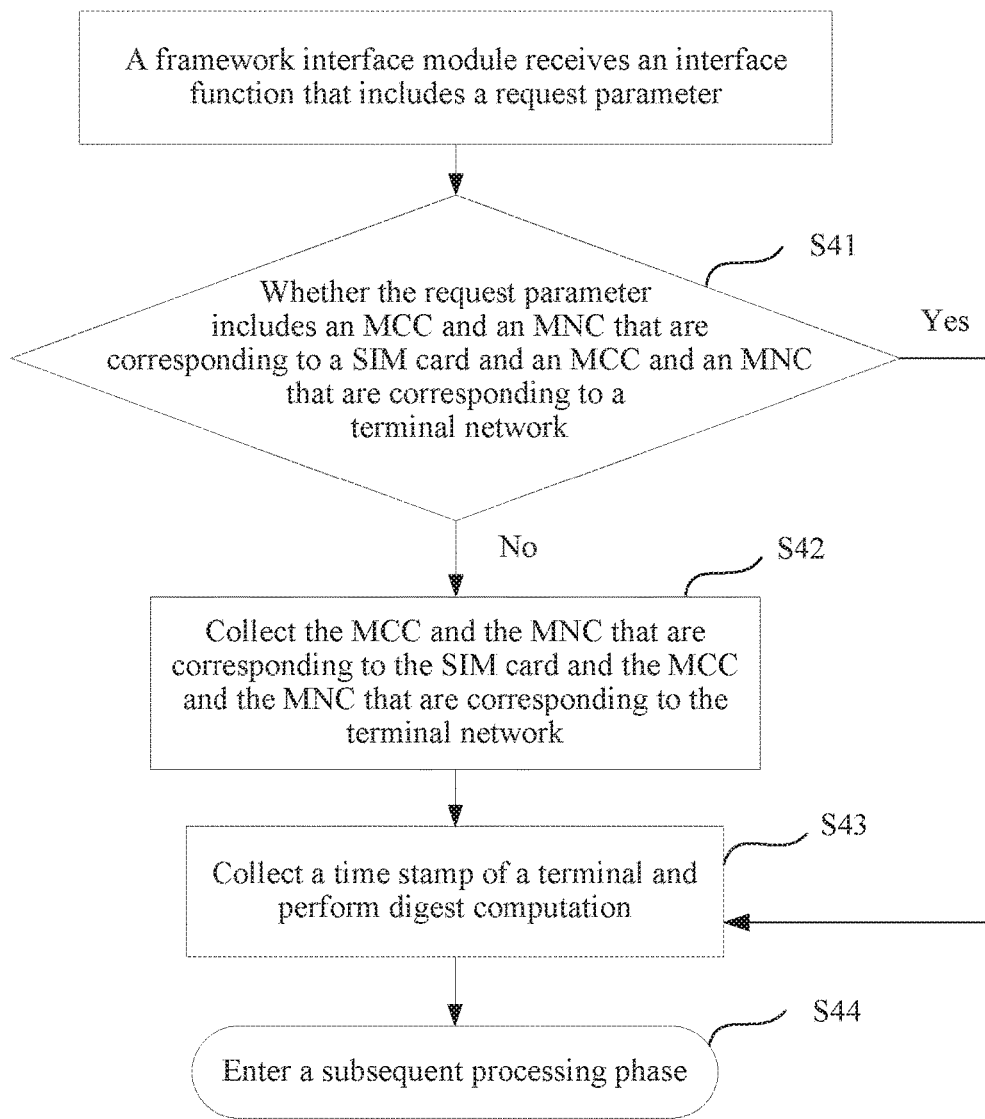
FIG. 4 is a flowchart of performing logical processing by a framework interface module according to Embodiment 4.

This embodiment is used to describe a further improvement made, in a mode in which a roaming status of a terminal is computed locally, to ensure accuracy in determining a roaming status when a terminal is offline. Corresponding to a mode in which a roaming status of a terminal is computed in the cloud, the mode in which a roaming status of a terminal is computed locally is mainly applied to an application scenario of a service that requires relatively low accuracy in determining the roaming status of the terminal. For example, a subscriber simply wants to learn such a service as the roaming status that does not involve a communication tariff. Although a result of the determining is not as accurate as that of the mode in which a roaming status of a terminal is computed in the cloud, because of offline determining, the terminal determines the roaming status more quickly, and in the application scenario of the service that requires relatively low accuracy in determining the roaming status of the terminal, a requirement of the subscriber can be met and traffic can also be saved. Because a correspondence, stored in the terminal, between a country code, an MCC, an MNC, and an operator is used when the terminal performs offline determining, to ensure that the correspondence is relatively complete, comprehensive, and new enough, a procedure of updating the correspondence between a country code, an MCC, an MNC, and an operator is provided in this embodiment. In a system, involved in this embodiment, for determining the roaming status of the terminal, in addition to the terminal and a server, a push server is further included, where the push server can also be implemented using a function module disposed in the terminal. As described in Embodiment 1, an action executed by the terminal in this embodiment is executed by a framework interface module in the terminal. As shown in FIG. 3, a method for determining a roaming status of a terminal further includes the following steps.

S31. A framework interface module receives a data update instruction sent by a server using a push server.

The data update instruction is sent by the server when the correspondence, stored in the server, between a country code, an MCC, an MNC, and an operator changes. The server may periodically monitor the correspondence stored in the server, to determine whether the correspondence changes, for example, whether there is an increase, a decrease, or a replacement of a country code, an MCC, an MNC, and an operator; when it is determined that the correspondence changes, the server sends the data update instruction to the push server. (When the correspondence does not change, the server also sends a corresponding instruction to the push server, to notify the push server that the current correspondence does not change.) The push server pushes the data request instruction to the terminal using a push mechanism (that is, only when the received instruction is a data update instruction sent by the server, the data update instruction is pushed to the terminal, and if the received instruction is another instruction, the instruction is not pushed), so that the framework interface module in the terminal receives the data request instruction.

S32. The framework interface module sends a data request instruction to the server according to the data update instruction.

After receiving the data update instruction pushed by the push server, the framework interface module determines that the correspondence stored in the server changes, and the correspondence stored in the framework interface module also needs to change accordingly. Therefore, the framework interface module sends the data request instruction to the server.

S33. The framework interface module receives a changed correspondence sent by the server according to the data request instruction, and updates a correspondence stored in the terminal.

After receiving the data request instruction sent by the framework interface module, the server reads the changed correspondence stored in the server, and sends the correspondence to the framework interface module. In this way, after the framework interface module receives the correspondence, the correspondence stored in the terminal is updated to the changed correspondence.

According to the method provided in Embodiment 3, because a change mechanism of a correspondence is added, the terminal that performs offline determining can rely on a relatively new correspondence. Therefore, accuracy in offline computing a roaming status can be improved. Moreover, in comparison with a manner in which the terminal spontaneously sends a request, in a manner in which a server delivers an instruction, a push server pushes an instruction, and a terminal responds to the instruction in this embodiment, the terminal performs downloading and updating only when determining that a correspondence stored in the server changes. Therefore, a resource waste caused by repeated downloading of the terminal (a correspondence between two consecutive times of downloading does not change) can be avoided.

Embodiment 4

This embodiment is used to describe a framework interface module in a terminal, where the framework interface module belongs to a function module at a bottom layer. A service module at an application layer can invoke the framework interface module to determine a roaming status of the terminal.

The service module performs a service by calling an interface function provided by the framework interface module, where a request parameter that may be included in the interface function includes a processing mode that is selected for the service, that is, a mode in which a roaming status of a terminal is computed in the cloud or a mode in which a roaming status of a terminal is computed locally. In addition, the interface function may further include an MCC and an MNC that are corresponding to a SIM card, and an MCC and an MNC that are corresponding to a terminal network. The service module transfers the interface function to the framework interface module, and the framework interface module receives the interface function and performs logical processing on the interface function. A specific procedure of the logical processing is as follows.

S41. A framework interface module determines whether a request parameter includes an MCC and an MNC that are corresponding to a SIM card and an MCC and an MNC that are corresponding to a terminal network. If the request parameter does not include the MCC and the MNC that are corresponding to the SIM card and the MCC and the MNC that are corresponding to the terminal network, S42 is executed; if the request parameter includes the MCC and the MNC that are corresponding to the SIM card and the MCC and the MNC that are corresponding to the terminal network, S43 is executed.

S42. The framework interface module automatically collects the MCC and the MNC that are corresponding to the SIM card and the MCC and the MNC that are corresponding to the terminal network. For a specific collecting manner, refer to the foregoing Embodiment 1.

S43. The framework interface module collects a time stamp of a terminal, and performs digest computation according to the MCC and the MNC that are corresponding to the SIM card, the MCC and the MNC that are corresponding to the terminal network, and the time stamp of the terminal.

In S43, a function of performing digest computation is to avoid malicious tampering of data such as the MCC and the MNC in a transmission process, thereby ensuring safety of data transmission. For example, Original data: 46000:46000:1401247047491

Encrypted data: 46000:46000:1401247047491: 5ff06c4120200b5e89770e4a4a9cfe3f

Digest: ab2e3786e6d00c04a6632c5a676a6c0

Digest algorithm: MD5 (46000:46000:1401247047491: key)

However, in the present disclosure, digest computation is not limited to be performed necessarily, and an executor may make a choice according to a practical requirement.

S44. Enter a subsequent processing phase: If a processing manner is a mode in which a roaming status of a terminal is computed in the cloud, the framework interface module sends terminal roaming status request information to a server, and enters the mode in which a roaming status of a terminal is computed in the cloud, and if the processing manner is a mode in which a roaming status of a terminal is computed locally, the framework interface module determines a roaming status of the terminal using a logical processor in the framework interface module and according to a correspondence between a country code, an MCC, an MNC, and an operator, the MCC and the MNC that are corresponding to the SIM card, and the MCC and the MNC that are corresponding to the terminal network.

In S44, the terminal roaming status request information that is sent by the framework interface module to the server carries the MCC and the MNC that are corresponding to the SIM card and the MCC and the MNC that are corresponding to the terminal network, and may further carry the time stamp of the terminal and the digest.

According to this embodiment, because the framework interface module has a function of digest computation, safety of data transmission is improved.

Embodiment 5

Figure 5A:
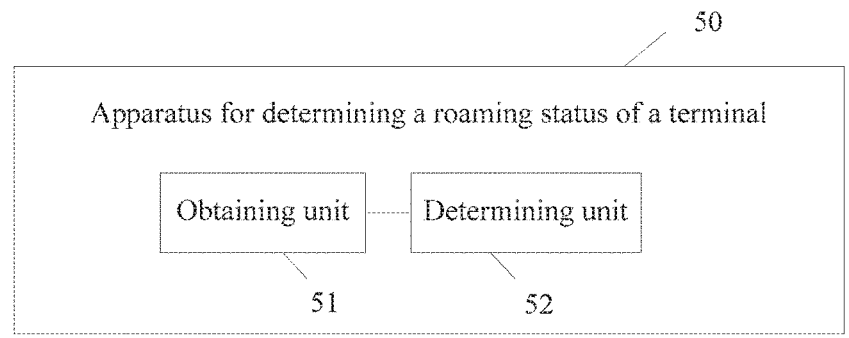
FIG. 5A is a schematic structural diagram of an apparatus for determining a roaming status of a terminal according to Embodiment 5.

Corresponding to the methods for determining a roaming status of a terminal provided in Embodiment 1 to Embodiment 4, Embodiment 5 provides an apparatus for determining a roaming status of a terminal, where the apparatus is applied to a terminal. As shown in the FIG. 5A, the apparatus 50 includes an obtaining unit 51 configured to obtain an MCC and an MNC that are corresponding to a SIM card in the terminal, and an MCC and an MNC that are corresponding to a terminal network currently accessed by the terminal; and a determining unit 52 configured to determine a roaming status of the terminal according to the MCC and the MNC that are corresponding to the SIM card and that are obtained by the obtaining unit 51, the MCC and the MNC that are corresponding to the terminal network and that are obtained by the obtaining unit 51, and a correspondence between a country code, an MCC, an MNC, and an operator.

In the prior art, only an MCC is used to determine a roaming status, and therefore, a result of the determining is not accurate enough. By contrast, according to the apparatus and the like provided in Embodiment 5, factors such as MCCs and MNCs that are corresponding to a SIM card and a terminal network, and a correspondence between a country code, an MCC, an MNC, and an operator are comprehensively considered, and these factors can comprehensively reflect features of different roaming states, so that accuracy in determining the roaming status of the terminal can be improved.

Figure 5B:
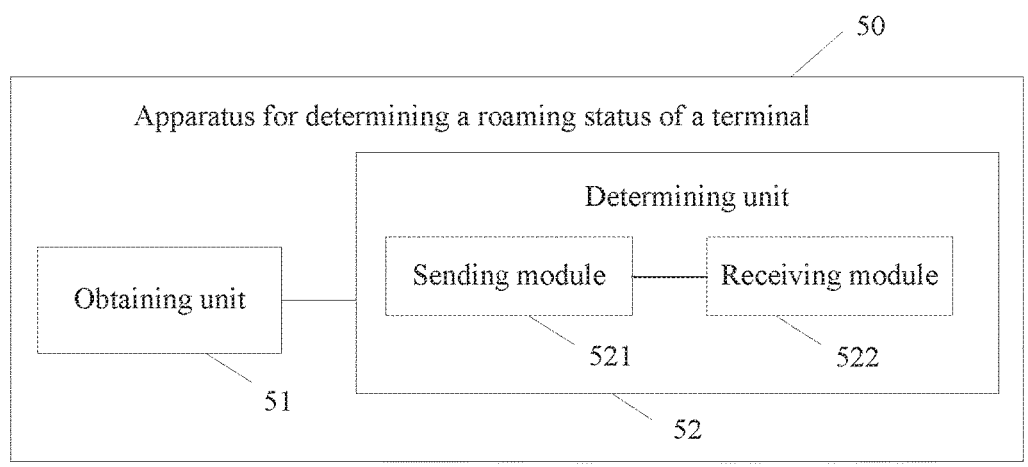
FIG. 5B is another schematic structural diagram of an apparatus for determining a roaming status of a terminal according to Embodiment 5.

In a specific implementation manner of Embodiment 5, the apparatus 50 may be used in a mode in which a roaming status of a terminal is computed in the cloud. In this mode, as shown in FIG. 5B, the determining unit 52 includes a sending module 521 configured to send terminal roaming status request information to a server in the mode in which the roaming status of the terminal is computed in the cloud, where the terminal roaming status request information carries the MCC and the MNC that are corresponding to the SIM card and that are obtained by the obtaining unit 51 and the MCC and the MNC that are corresponding to the terminal network and that are obtained by the obtaining unit 51, and the terminal roaming status request information is used to request the server to determine the roaming status of the terminal according to the correspondence between a country code, an MCC, an MNC, and an operator; and a receiving module 522 configured to receive terminal roaming status response information sent by the server, where the terminal roaming status response information carries the roaming status of the terminal, and the terminal roaming status response information is a response, of the server, to the terminal roaming status request information sent by the apparatus 50.

In addition to the mode in which a roaming status of a terminal is computed in the cloud, the apparatus 50 may further select a mode in which a roaming status of a terminal is computed locally. In this mode, the determining unit 52 may be configured to determine the roaming status of the terminal according to the correspondence between a country code, an MCC, an MNC, and an operator, the MCC and the MNC that are corresponding to the SIM card, and the MCC and the MNC that are corresponding to the terminal network.

In the mode in which a roaming status of a terminal is computed locally, the determining unit 52 is configured to, according to the correspondence between a country code, an MCC, an MNC, and an operator, and the MCC corresponding to the SIM card, determine a home country code corresponding to the SIM card, and determine an MCC set corresponding to the home country code; when the MCC corresponding to the terminal network does not belong to the MCC set corresponding to the home country code, determine that the terminal is in an international roaming state; according to the correspondence between a country code, an MCC, an MNC, and an operator, and the MNC corresponding to the SIM card, determine a home operator to which the SIM card belongs, and determine an MNC set corresponding to the home operator; when the MCC corresponding to the terminal network belongs to the MCC set corresponding to the home country code, and the MNC corresponding to the terminal network does not belong to the MNC set corresponding to the home operator, determine that the terminal is in an inter-operator roaming state; and when the MCC corresponding to the terminal network belongs to the MCC set corresponding to the home country code, and the MNC corresponding to the terminal network belongs to the MNC set corresponding to the home operator, determine that the terminal is in an intra-operator roaming state.

Figure 5C:
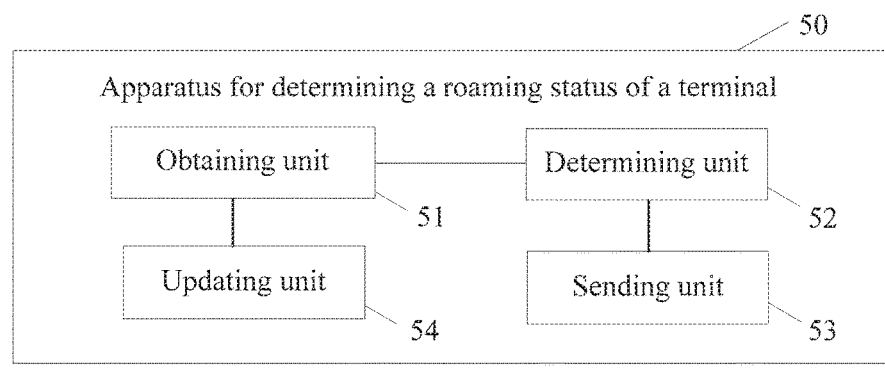
FIG. 5C is still another schematic structural diagram of an apparatus for determining a roaming status of a terminal according to Embodiment 5.

To improve accuracy in locally computing the roaming status of the terminal, the obtaining unit 51 is further configured to, when the correspondence, stored in the server, between a country code, an MCC, an MNC, and an operator changes, receive a data update instruction sent by the server using a push server, where the data update instruction is a trigger instruction that triggers the terminal to update the correspondence, stored in the terminal, between a country code, an MCC, an MNC, and an operator. As shown in FIG. 5C, the apparatus 50 further includes a sending unit 53, configured to send a data request instruction to the server according to the data update instruction. The obtaining unit 51 is further configured to receive the changed correspondence sent by the server according to the data request instruction. The apparatus 50 further includes an updating unit 54 configured to update the correspondence stored in the terminal.

As described in the foregoing embodiment, the apparatus for determining a roaming status of a terminal may be a framework interface module in the terminal, and a service module in the terminal may obtain the roaming status of the terminal by invoking the framework interface module. In the framework interface module, corresponding to the obtaining unit 51, the framework interface module may include a SIM card submodule configured to, when an interface function called by the service module does not include the MCC and the MNC that are corresponding to the SIM card in the terminal, obtain the MCC and the MNC that are corresponding to the SIM card in the terminal; or when an interface function called by the service module includes the MCC and the MNC that are corresponding to the SIM card in the terminal, read the MCC and the MNC that are corresponding to the SIM card in the terminal from the interface function. Corresponding to the obtaining unit 51, the framework interface module may further include a terminal network submodule configured to obtain or read the MCC and the MNC that are corresponding to the terminal network. Moreover, a function of the terminal network submodule is further corresponding to the sending module 521 and the receiving module 522, and the terminal network submodule is configured to send the terminal roaming status request information and receive the terminal roaming status response information. In addition, the framework interface module may further include a logical processor and a data storage device, where the date storage device may store the correspondence between a country code, an MCC, an MNC, and an operator. A function of the logical processor is corresponding to a function of the determining unit 52 and a function of the updating unit 54, and the logical processor is used in the mode in which a roaming status of a terminal is computed locally.

Embodiment 6

Corresponding to the methods for determining a roaming status of a terminal provided in Embodiment 1 to Embodiment 4, Embodiment 6 provides a terminal. FIG. 6 is a schematic structural diagram of the terminal according to Embodiment 6. As shown in FIG. 6, a terminal 60 in this embodiment includes at least one processor 61, a transmitter 62, a receiver 63, a memory 64, and a bus. The processor 61, the transmitter 62, the receiver 63, and the memory 64 are connected and complete mutual communication using the bus. The bus may be an industry standard architecture (ISA) bus, a peripheral component interconnect (PCIt) bus, an Extended Industry Standard Architecture (EISA) bus, or the like. The bus may be classified into an address bus, a data bus, a control bus, and the like. For convenience of denotation, the bus is represented using only one bold line in FIG. 6; however, it does not indicate that there is only one bus or only one type of buses. As shown in FIG. 6, the terminal 60 includes the following.

The processor 61 is configured to obtain an MCC and an MNC that are corresponding to a SIM card in the terminal 60 and an MCC and an MNC that are corresponding to a terminal network currently accessed by the terminal 60.

The processor 61 is further configured to determine a roaming status of the terminal 60 according to the obtained MCC and MNC that are corresponding to the SIM card, the obtained MCC and MNC that are corresponding to the terminal network, and a correspondence between a country code, an MCC, an MNC, and an operator.

The processor 61 may determine the roaming status of the terminal 60 in a mode in which a roaming status of a terminal is computed in the cloud or a mode in which a roaming status of a terminal is computed locally.

In the mode in which a roaming status of a terminal is computed in the cloud, the transmitter 62 is configured to send terminal roaming status request information to a server, where the terminal roaming status request information carries the MCC and the MNC that are corresponding to the SIM card and that are obtained by the processor 61 and the MCC and the MNC that are corresponding to the terminal network and that are obtained by the processor 61.

The receiver 63 is configured to receive terminal roaming status response information sent by the server, where the terminal roaming status response information carries the roaming status of the terminal 60. The server determines the roaming status of the terminal 60 according to the correspondence between a country code, an MCC, an MNC, and an operator, and the terminal roaming status request information.

In addition to the mode in which a roaming status of a terminal is computed in the cloud, the terminal 60 may also select the mode in which a roaming status of a terminal is computed locally. In this mode, the processor 61 is further configured to determine the roaming status of the terminal 60 according to the correspondence between a country code, an MCC, an MNC, and an operator, the MCC and the MNC that are corresponding to the SIM card, and the MCC and the MNC that are corresponding to the terminal network.

In the mode in which a roaming status of a terminal is computed locally, the processor 61 is configured to, according to the correspondence between a country code, an MCC, an MNC, and an operator, and the MCC corresponding to the SIM card, determine a home country code corresponding to the SIM card, and determine an MCC set corresponding to the home country code; when the MCC corresponding to the terminal network does not belong to the MCC set corresponding to the home country code, determine that the terminal 60 is in an international roaming state; according to the correspondence between a country code, an MCC, an MNC, and an operator, and the MNC corresponding to the SIM card, determine a home operator to which the SIM card belongs, and determine an MNC set corresponding to the home operator; when the MCC corresponding to the terminal network belongs to the MCC set corresponding to the home country code, and the MNC corresponding to the terminal network does not belong to the MNC set corresponding to the home operator, determine that the terminal 60 is in an inter-operator roaming state; and when the MCC corresponding to the terminal network belongs to the MCC set corresponding to the home country code, and the MNC corresponding to the terminal network belongs to the MNC set corresponding to the home operator, determine that the terminal 60 is in an intra-operator roaming state.

To improve accuracy in locally computing the roaming status of the terminal, the receiver 63 is further configured to, when the correspondence, stored in a server, between a country code, an MCC, an MNC, and an operator changes, receive a data update instruction sent by the server using a push server, where the data update instruction is a trigger instruction that triggers the terminal 60 to update the correspondence, stored in the terminal, between a country code, an MCC, an MNC, and an operator; the transmitter 62 is further configured to send a data request instruction to the server according to the data update instruction; the receiver 63 is further configured to receive the changed correspondence sent by the server according to the data request instruction; and the processor 61 is further configured to update the correspondence stored in the terminal 60, that is, to update the correspondence stored in the memory 64 of the terminal 60.

In Embodiment 6, when a roaming status is being computed, factors such as MCCs and MNCs that are corresponding to a SIM card and a terminal network, and the foregoing correspondence are comprehensively considered, and these factors can comprehensively reflect features of different roaming states, so that accuracy in determining a roaming status of a terminal can be improved.

Embodiment 7

Corresponding to Embodiment 1, Embodiment 7 provides a method for determining a roaming status of a terminal, where the method is executed by a server in the cloud. As shown in FIG. 7, the method includes the following steps.

S71. A server receives terminal roaming status request information sent by a terminal, where the terminal roaming status request information carries an MCC and an MNC that are corresponding to a SIM card in the terminal, and an MCC and an MNC that are of a terminal network currently accessed by the terminal.

S72. The server determines a roaming status of the terminal according to a correspondence between a country code, an MCC, an MNC, and an operator, and the terminal roaming status request information.

S73. The server sends, to the terminal, terminal roaming status response information that carries the roaming status of the terminal.

The terminal roaming status response information is a response, of the server, to the terminal roaming status request information sent by the terminal.

In the method for determining a roaming status of a terminal provided in Embodiment 7, a server stores a complete, comprehensive, and latest correspondence between a country code, an MCC, an MNC, and an operator, factors such as MCCs and MNCs that are corresponding to a SIM card and a terminal network, and the correspondence between a country code, an MCC, an MNC, and an operator are comprehensively considered, and these factors can comprehensively reflect features of different roaming states, so that accuracy in determining the roaming status of the terminal can be improved.

The terminal supports a cloud computing mode and a local computing mode. In the cloud computing mode, the server computes the roaming status of the terminal. For a specific manner, reference may be made to Embodiment 2, which mainly includes the following, according to the correspondence between a country code, an MCC, an MNC, and an operator, and the MCC that is corresponding to the SIM card and that is carried in the terminal roaming status request information, the server determines a home country code corresponding to the SIM card, and determines an MCC set corresponding to the home country code; when the MCC corresponding to the terminal network does not belong to the MCC set corresponding to the home country code, the server determines that the terminal is in an international roaming state; according to the correspondence between a country code, an MCC, an MNC, and an operator, and the MNC corresponding to the SIM card, the server determines a home operator to which the SIM card belongs, and determines an MNC set corresponding to the home operator; when the MCC corresponding to the terminal network belongs to the MCC set corresponding to the home country code, and the MNC corresponding to the terminal network does not belong to the MNC set corresponding to the home operator, the server determines that the terminal is in an inter-operator roaming state; and when the MCC corresponding to the terminal network belongs to the MCC set corresponding to the home country code, and the MNC corresponding to the terminal network belongs to the MNC set corresponding to the home operator, the server determines that the terminal is in an intra-operator roaming state.

Corresponding to Embodiment 3, when the terminal is in a mode in which a roaming status of a terminal is computed locally, the method further includes, when the correspondence, stored in the server, between a country code, an MCC, an MNC, and an operator changes, sending, by the server, a data update instruction to the terminal using a push server, where the data update instruction is a trigger instruction that triggers the terminal to update the correspondence, stored in the terminal, between a country code, an MCC, an MNC, and an operator; receiving, by the server, a data request instruction sent by the terminal according to the data update instruction; and sending, by the server, the changed correspondence to the terminal according to the data request instruction, so that the terminal updates the correspondence stored in the terminal.

Embodiment 8

Figure 8:
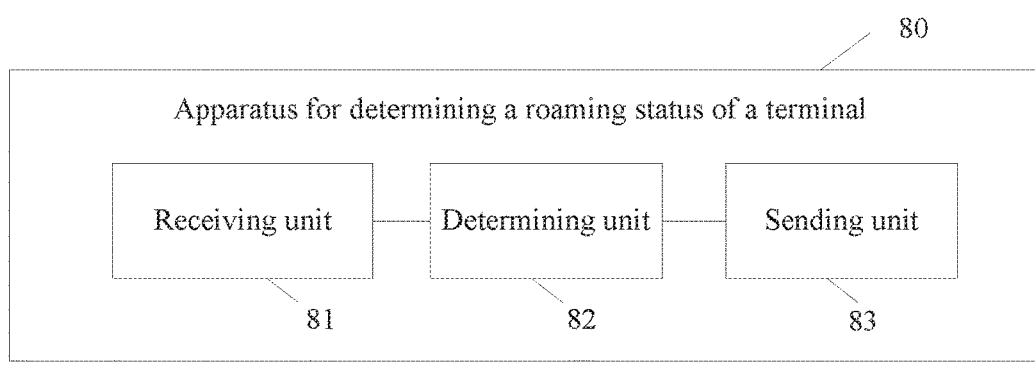
FIG. 8 is a schematic structural diagram of an apparatus for determining a roaming status of a terminal according to Embodiment 8.

Corresponding to the method for determining a roaming status of a terminal provided in Embodiment 7, Embodiment 8 provides an apparatus for determining a roaming status of a terminal, where the apparatus is applied to a server. As shown in FIG. 8, the apparatus 80 includes a receiving unit 81 configured to receive terminal roaming status request information sent by a terminal, where the terminal roaming status request information carries an MCC and an MNC that are corresponding to a SIM card in the terminal, and an MCC and an MNC that are of a terminal network currently accessed by the terminal; a determining unit 82 configured to determine a roaming status of the terminal according to a correspondence between a country code, an MCC, an MNC, and an operator, and the terminal roaming status request information received by the receiving unit 81; and a sending unit 83 configured to send, to the terminal, terminal roaming status response information that carries the roaming status, determined by the determining unit 82, of the terminal, where the terminal roaming status response information is a response, of the apparatus 80, to the terminal roaming status request information sent by the terminal.

When the terminal is in a mode in which a roaming status of a terminal is computed in the cloud, the determining unit 82 is configured to, according to the correspondence between a country code, an MCC, an MNC, and an operator, and the MCC that is corresponding to the SIM card and that is carried in the terminal roaming status request information, determine a home country code corresponding to the SIM card, and determine an MCC set corresponding to the home country code; when the MCC corresponding to the terminal network does not belong to the MCC set corresponding to the home country code, determine that the terminal is in an international roaming state; according to the correspondence between a country code, an MCC, an MNC, and an operator, and the MNC corresponding to the SIM card, determine a home operator to which the SIM card belongs, and determine an MNC set corresponding to the home operator; when the MCC corresponding to the terminal network belongs to the MCC set corresponding to the home country code, and the MNC corresponding to the terminal network does not belong to the MNC set corresponding to the home operator, determine that the terminal is in an inter-operator roaming state; and when the MCC corresponding to the terminal network belongs to the MCC set corresponding to the home country code, and the MNC corresponding to the terminal network belongs to the MNC set corresponding to the home operator, determine that the terminal is in an intra-operator roaming state.

When the terminal is in a mode in which a roaming status of a terminal is computed locally, to improve accuracy in locally computing the roaming status of the terminal, the sending unit 83 is further configured to, when the correspondence, stored in the server, between a country code, an MCC, an MNC, and an operator changes, send a data update instruction to the terminal using a push server, where the data update instruction is a trigger instruction that triggers the terminal to update the correspondence, stored in the terminal, between a country code, an MCC, an MNC, and an operator.

The receiving unit 81 is further configured to receive a data request instruction sent by the terminal according to the data update instruction.

The sending unit 83 is further configured to send the changed correspondence to the terminal according to the data request instruction, so that the terminal updates the correspondence stored in the terminal.

In the apparatus for determining a roaming status of a terminal provided in Embodiment 8, a server stores a complete, comprehensive, and latest correspondence between a country code, an MCC, an MNC, and an operator, when determining a roaming status, the apparatus comprehensively considers factors such as MCCs and MNCs that are corresponding to a SIM card and a terminal network, and the correspondence between a country code, an MCC, an MNC, and an operator, and these factors can comprehensively reflect features of different roaming states, so that accuracy in determining a roaming status of a terminal can be improved.

Embodiment 9

Figure 9:
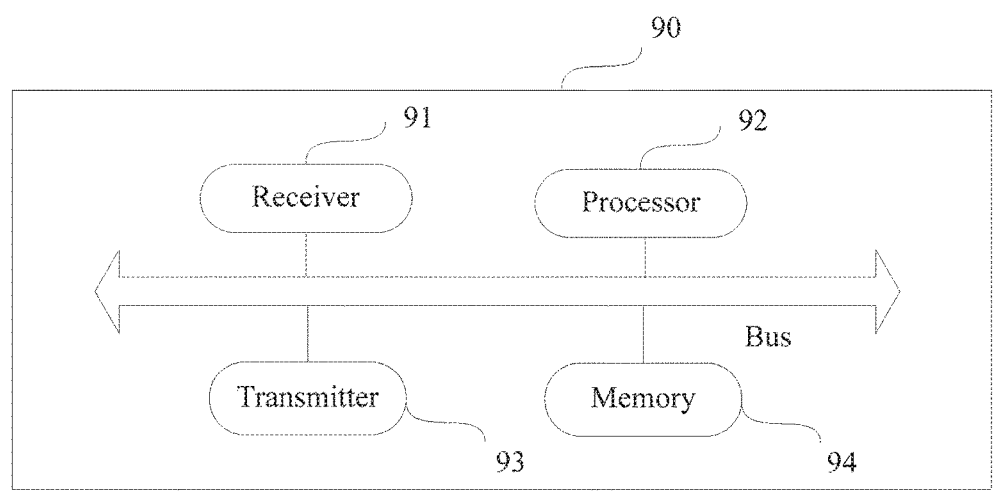
FIG. 9 is a schematic structural diagram of a server according to Embodiment 9.

Corresponding to the method for determining a roaming status of a terminal provided in Embodiment 7, Embodiment 9 provides a server. FIG. 9 is a schematic structural diagram of the server according to Embodiment 9. As shown in FIG. 9, a server 90 in this embodiment includes at least one receiver 91, a processor 92, a transmitter 93, a memory 94, and a bus. The receiver 91, the processor 92, the transmitter 93, and the memory 94 are connected and complete mutual communication using the bus. The bus may be an ISA bus, a PCI bus, an EISA bus, or the like. The bus may be classified into an address bus, a data bus, a control bus, and the like. For convenience of denotation, the bus is represented using only one bold line in FIG. 9; however, it does not indicate that there is only one bus or only one type of buses. As shown in FIG. 9, the server 90 includes the receiver 91 that is configured to receive terminal roaming status request information sent by a terminal, where the terminal roaming status request information carries an MCC and an MNC that are corresponding to a SIM card in the terminal, and an MCC and an MNC that are of a terminal network currently accessed by the terminal.

The processor 92 is configured to determine a roaming status of the terminal according to a correspondence between a country code, an MCC, an MNC, and an operator, and the terminal roaming status request information received by the receiver 91.

The transmitter 91 is configured to send, to the terminal, terminal roaming status response information that carries the roaming status, determined by the processor 92, of the terminal, where the terminal roaming status response information is a response, of the server 90, to the terminal roaming status request information sent by the terminal.

When the terminal is in a mode in which a roaming status of a terminal is computed in the cloud, the processor 92 is configured to, according to the correspondence between a country code, an MCC, an MNC, and an operator, and the MCC that is corresponding to the SIM card and that is carried in the terminal roaming status request information, determine a home country code corresponding to the SIM card, and determine an MCC set corresponding to the home country code; when the MCC corresponding to the terminal network does not belong to the MCC set corresponding to the home country code, determine that the terminal is in an international roaming state; according to the correspondence between a country code, an MCC, an MNC, and an operator, and the MNC corresponding to the SIM card, determine a home operator to which the SIM card belongs, and determine an MNC set corresponding to the home operator; when the MCC corresponding to the terminal network belongs to the MCC set corresponding to the home country code, and the MNC corresponding to the terminal network does not belong to the MNC set corresponding to the home operator, determine that the terminal is in an inter-operator roaming state; and when the MCC corresponding to the terminal network belongs to the MCC set corresponding to the home country code, and the MNC corresponding to the terminal network belongs to the MNC set corresponding to the home operator, determine that the terminal is in an intra-operator roaming state.

When the terminal is in a mode in which a roaming status of a terminal is computed locally, to improve accuracy in locally computing the roaming status of the terminal, the transmitter 93 is further configured to, when the correspondence, stored in the memory 94, between a country code, an MCC, an MNC, and an operator changes, send a data update instruction to the terminal using a push server, where the data update instruction is a trigger instruction that triggers the terminal to update the correspondence, stored in the terminal, between a country code, an MCC, an MNC, and an operator; the receiver 91 is further configured to receive a data request instruction sent by the terminal according to the data update instruction; and the transmitter 93 is further configured to send the changed correspondence to the terminal according to the data request instruction, so that the terminal updates the correspondence stored in the terminal.

In the apparatus for determining a roaming status of a terminal provided in Embodiment 9, a server stores a complete, comprehensive, and latest correspondence between a country code, an MCC, an MNC, and an operator, when determining a roaming status, the server comprehensively considers factors such as MCCs and MNCs that are corresponding to a SIM card and a terminal network, and the correspondence between a country code, an MCC, an MNC, and an operator, and these factors can comprehensively reflect features of different roaming states, so that accuracy in determining a roaming status of a terminal can be improved.

Each embodiment in the specification is described with emphasis. The same or similar parts in the embodiments are references to each other. Each embodiment focuses on description of a difference from the other embodiments. Especially, an apparatus embodiment is basically similar to a method embodiment, and therefore is described briefly; for related parts, reference may be made to partial descriptions in the method embodiment.

It should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present disclosure, connection relationships between modules indicate that the modules have communication connections with each other, which may be implemented as one or more communications buses or signal cables. Persons of ordinary skill in the art may understand and implement the embodiments of the present disclosure without creative efforts.

What is claimed is:

1. A method for determining a roaming status of a terminal, comprising:
   obtaining, by the terminal, a mobile country code (MCC) and a mobile network code (MNC) that are corresponding to a subscriber identity module (SIM) card in the terminal, and an MCC and an MNC that are corresponding to a terminal network currently accessed by the terminal; and
   determining by the terminal, a roaming status of the terminal according to the MCC and the MNC that are corresponding to the SIM card, the MCC and the MNC that are corresponding to the terminal network, and a correspondence between a country code, an MCC, an MNC, and an operator,
   wherein the operator comprises a communications operator of the terminal network,
   wherein the correspondence between the county code, the MCC, the MNC, and the operator comprises a correspondence between the country code, the MCC, the MNC, and a name of the operator, and
   wherein determining, by the terminal, the roaming status of the terminal according to the MCC and the MNC that are corresponding to the SIM card, the MCC and the MNC that are corresponding to the terminal network, and the correspondence between the country code, the MCC, the MNC, and the operator comprises:
      sending, by the terminal, terminal roaming status request information to a server in a mode in which a roaming status of the terminal is computed in a cloud, wherein the terminal roaming status request information carries the MCC and the MNC that are corresponding to the SIM card, and the MCC and the MNC that are corresponding to the terminal network, and wherein the terminal roaming status request information requests the server to determine the roaming status of the terminal according to the correspondence between the country code, the MCC, the MNC, and the operator; and
      receiving, by the terminal, terminal roaming status response information from the server, wherein the terminal roaming status response information carries the roaming status of the terminal, and wherein the terminal roaming status response information is a response, of the server, to the terminal roaming status request information from the terminal.

2. A method for determining a roaming status of a terminal, comprising:
   obtaining, by the terminal, a mobile country code (MCC) and a mobile network code (MNC) that are corresponding to a subscriber identity module (SIM) card in the terminal, and an MCC and an MNC that are corresponding to a terminal network currently accessed by the terminal; and
   determining, by the terminal, a roaming status of the terminal according to the MCC and the MNC that are corresponding to the SIM card, the MCC and the MNC that are corresponding to the terminal network, and a correspondence between a country code, an MCC, an MNC, and an operator, wherein the operator comprises a communications operator of the terminal network, wherein the correspondence between the county code, the MCC, the MNC, and the operator comprises a correspondence between the country code, the MCC, the MNC, and a name of the operator, wherein determining, by the terminal, the roaming status of the terminal according to the MCC and the MNC that are corresponding to the SIM card, the MCC and the MNC that are corresponding to the terminal network, and the correspondence between the country code, the MCC, the MNC, and the operator comprises determining, by the terminal, the roaming status of the terminal in a mode in which a roaming status of the terminal is computed locally according to the correspondence between the country code, the MCC, the MNC, and the operator, the MCC and the MNC that are corresponding to the SIM card, and the MCC and the MNC that are corresponding to the terminal network, and wherein determining, by the terminal, the roaming status of the terminal according to the correspondence between the country code, the MCC, the MNC, and the operator, the MCC and the MNC that are corresponding to the SIM card, and the MCC and the MNC that are corresponding to the terminal network comprises:

determining, by the terminal, a home country code corresponding to the SIM card;

determining an MCC set corresponding to the home country code according to the correspondence between the country code, the MCC, the MNC, and the operator, and the MCC corresponding to the SIM card;

determining, by the terminal, that the terminal is in an international roaming state when the MCC corresponding to the terminal network does not belong to the MCC set corresponding to the home country code;

determining, by the terminal, a home operator to which the SIM card belongs;

determining an MNC set corresponding to the home operator according to the correspondence between the country code, the MCC, the MNC, and the operator, and the MNC corresponding to the SIM card;

determining, by the terminal, that the terminal is in an inter-operator roaming state when the MCC corresponding to the terminal network belongs to the MCC set corresponding to the home country code, and the MNC corresponding to the terminal network does not belong to the MNC set corresponding to the home operator; and determining, by the terminal, that the terminal is in an intra-operator roaming state when the MCC corresponding to the terminal network belongs to the MCC set corresponding to the home country code, and the MNC corresponding to the terminal network belongs to the MNC set corresponding to the home operator.

3. A method for determining a roaming status of a terminal, comprising:

obtaining, by the terminal, a mobile country code (MCC) and a mobile network code (MNC) that are corresponding to a subscriber identity module (SIM) card in the terminal, and an MCC and an MNC that are corresponding to a terminal network currently accessed by the terminal; and determining, by the terminal, a roaming status of the terminal according to the MCC and the MNC that are corresponding to the SIM card, the MCC and the MNC that are corresponding to the terminal network, and a correspondence between a country code, an MCC, an MNC, and an operator, wherein the operator comprises a communications operator of the terminal network, wherein the correspondence between the county code, the MCC, the MNC, and the operator comprises a correspondence between the country code, the MCC, the MNC, and a name of the operator, wherein determining, by the terminal, the roaming status of the terminal according to the MCC and the MNC that are corresponding to the SIM card, the MCC and the MNC that are corresponding to the terminal network, and the correspondence between the country code, the MCC, the MNC, and the operator comprises determining, by the terminal, the roaming status of the terminal in a mode in which a roaming status of the terminal is computed locally according to the correspondence between the country code, the MCC, the MNC, and the operator, the MCC and the MNC that are corresponding to the SIM card, and the MCC and the MNC that are corresponding to the terminal network, and wherein the method further comprises:

receiving, by the terminal, a data update instruction from the server using a push server when the correspondence, stored in a server, between the country code, the MCC, the MNC, and the operator changes, wherein the data update instruction is a trigger instruction that triggers the terminal to update the correspondence, stored in the terminal, between the country code, the MCC, the MNC, and the operator;

sending, by the terminal, a data request instruction to the server according to the data update instruction;

receiving, by the terminal, the changed correspondence from the server according to the data request instruction; and updating the correspondence stored in the terminal.

4. A terminal, comprising:

a memory comprising instructions; and a processor coupled to memory, wherein the instructions cause the processor to be configured to:

obtain a mobile country code (MCC) and a mobile network code (MNC) that are corresponding to a subscriber identity module (SIM) card in the terminal, and an MCC and an MNC that are corresponding to a terminal network currently accessed by the terminal; and determine a roaming status of the terminal according to the obtained MCC and MNC that are corresponding to the SIM card, the obtained MCC and MNC that are corresponding to the terminal network, and a correspondence between a country code, an MCC, an MNC, and an operator, wherein the operator comprises a communications operator of the terminal network, wherein the correspondence between the county code, the MCC, the MNC, and the operator comprises a correspondence between the country code, the MCC, the MNC, and a name of the operator, and wherein a mode in Which a roaming status of the terminal is computed in a cloud;

a transmitter coupled to the processor and configured to send terminal roaming status request information to a server, wherein the terminal roaming status request information carries the MCC and the MNC that are corresponding to the SIM card and that are obtained by the processor and the MCC and the MNC that are corresponding to the terminal network and that are obtained by the processor, and wherein the terminal roaming status request information requests the server to determine the roaming status of the terminal according to the correspondence between a country code, an MCC, an MNC, and an operator; and a receiver coupled to the processor and configured to receive terminal roaming status response information from the server, wherein the terminal roaming status response information carries the roaming status of the terminal, and wherein the terminal roaming status response information is a response, of the server, to the terminal roaming status request information from the terminal.

5. A terminal, comprising:

a memory comprising instructions; and a processor coupled to memory, wherein the instructions cause the processor to be configured to:

obtain a mobile country code (MCC) and a mobile network code (MNC) that are corresponding to a subscriber identity module (SIM) card in the terminal, and an MCC and an MNC that are corresponding to a terminal network currently accessed by the terminal; and determine a roaming status of the terminal according to the obtained MCC and MNC that are corresponding to the SIM card, the obtained MCC and MNC that are corresponding to the terminal network, and a correspondence between a country code, an MCC, an MNC, and an operator, wherein the operator comprises a communications operator of the terminal network, wherein the correspondence between the county code, the MCC, the MNC, and the operator comprises a correspondence between the country code, the MCC, the MNC, and a name of the operator, and wherein a mode in which a roaming status of the terminal is computed locally, the instructions further cause the processor to be configured to determine the roaming status of the terminal according to the correspondence between a country code of the terminal, an MCC, an MNC, and an operator, the MCC and the MNC that are corresponding to the SIM card, and the MCC and the MNC that are corresponding to the terminal network;

determine a home country code corresponding to the SIM card;

determine an MCC set corresponding to the home country code according to the correspondence between a country code of the terminal, an MCC, an MNC, and an operator, and the MCC corresponding to the SIM card;

determine that the terminal is in an international roaming state when the MCC corresponding to the terminal network does not belong to the MCC set corresponding to the home country code;

determine a home operator to which the SIM card belongs;

determine an MNC set corresponding to the home operator according to the correspondence between a country code of the terminal, an MCC, an MNC, and an operator, and the MNC corresponding to the SIM card;

determine that the terminal is in an inter-operator roaming state when the MCC corresponding to the terminal network belongs to the MCC set corresponding to the home country code, and the MNC corresponding to the terminal network does not belong to the MNC set corresponding to the home operator; and determine that the terminal is in an intra-operator roaming state when the MCC corresponding to the terminal network belongs to the MCC set corresponding to the home country code, and the MNC corresponding to the terminal network belongs to the MNC set corresponding to the home operator.

6. A terminal, comprising:

a memory comprising instructions; and a processor coupled to memory, wherein the instructions cause the processor to be configured to:

obtain a mobile country code (MCC) and a mobile network code (MNC) that are corresponding to a subscriber identity module (SIM) card in the terminal, and an MCC and an MNC that are corresponding to a terminal network currently accessed by the terminal; and determine a roaming status of the terminal according to the obtained MCC and MNC that are corresponding to the SIM card, the obtained MCC and MNC that are corresponding to the terminal network, and a correspondence between a country code, an MCC, an MNC, and an operator, wherein the operator comprises a communications operator of the terminal network, wherein the correspondence between the county code, the MCC, the MNC, and the operator comprises a correspondence between the country code, the MCC, the MNC, and a name of the operator, and wherein a mode in which a roaming status of the terminal is computed locally, the instructions further cause the processor to be configured to determine the roaming status of the terminal according to the correspondence between a country code of the terminal, an MCC, an MNC, and an operator, the MCC and the MNC that are corresponding to the SIM card, and the MCC and the MNC that are corresponding to the terminal network;

a receiver coupled to the processor and configured to receive a data update instruction from the server using a push server when the correspondence, stored in a server, between a country code, an MCC, an MNC, and an operator changes, wherein the data update instruction is a trigger instruction that triggers the terminal to update the correspondence, stored in the terminal, between a country code, an MCC, an MNC, and an operator; and a transmitter coupled to the processor and configured to send a data request instruction to the server according to the data update instruction, wherein the receiver is further configured to receive the changed correspondence from the server according to the data request instruction, and wherein the instructions further cause the processor to be configured to update the correspondence stored in the terminal.

7. A method for determining a roaming status of a terminal, comprising:

receiving, by a server, terminal roaming status request information from the terminal, wherein the terminal roaming status request information carries a mobile country code (MCC) and a mobile network code (MNC) that are corresponding to a subscriber identity module (SIM) card in the terminal, and an MCC and an MNC that are corresponding to a terminal network currently accessed by the terminal;

determining, by the server, a roaming status of the terminal according to a correspondence between a country code, an MCC, an MNC, and an operator, and the terminal roaming status request information, wherein the operator comprises a communications operator of the terminal network, and wherein the correspondence between the county code, the MCC, the MNC, and the operator comprises a correspondence between the country code, the MCC, the MNC, and a name of the operator; and sending, to the terminal by the server, terminal roaming status response information that carries the roaming status of the terminal, wherein the terminal roaming status response information is a response, of the server, to the terminal roaming status request information from the terminal, and wherein determining, by the server, the roaming status of the terminal according to the correspondence between the country code, the MCC, the MNC, and the operator, and the terminal roaming status request information comprises:

determining, by the server, a home country code corresponding to the SIM card;

determining an MCC set corresponding to the home country code according to the correspondence between a country code, an MCC, an MNC, and an operator, and the MCC that is corresponding to the SIM card and that is carried in the terminal roaming status request information;

determining, by the server, that the terminal is in an international roaming state when the MCC corresponding to the terminal network does not belong to the MCC set corresponding to the home country code;

determining, by the server, a home operator to which the SIM card belongs;

determining an MNC set corresponding to the home operator according to the correspondence between a country code, an MCC, an MNC, and an operator, and the MNC corresponding to the SIM card;

determining, by the server, that the terminal is in an inter-operator roaming state when the MCC corresponding to the terminal network belongs to the MCC set corresponding to the home country code, and the MNC corresponding to the terminal network does not belong to the MNC set corresponding to the home operator; and determining, by the server, that the terminal is in an intra-operator roaming state when the MCC corresponding to the terminal network belongs to the MCC set corresponding to the home country code, and the MNC corresponding to the terminal network belongs to the MNC set corresponding to the home operator.

8. A method for determining a roaming status of a terminal, comprising:

receiving, by a server, terminal roaming status request information from the terminal, wherein the terminal roaming status request information carries a mobile country code (MCC) and a mobile network code (MNC) that are corresponding to a subscriber identity module (SIM) card in the terminal, and an MCC and an MNC that are corresponding to a terminal network currently accessed by the terminal;

determining, by the server, a roaming status of the terminal according to a correspondence between a country code, an MCC, an MNC, and an operator, and the terminal roaming status request information, wherein the operator comprises a communications operator of the terminal network, and wherein the correspondence between the county code, the MCC, the MNC, and the operator comprises a correspondence between the country code, the MCC, the MNC, and a name of the operator; and sending, to the terminal by the server, terminal roaming status response information that carries the roaming status of the terminal, wherein the terminal roaming status response information is a response, of the server, to the terminal roaming status request information from the terminal, and wherein when the terminal is in a mode in which a roaming status of the terminal is computed locally, the method further comprises:

sending, by the server, a data update instruction to the terminal using a push server when the correspondence, stored in the server, between a country code, an MCC, an MNC, and an operator changes, wherein the data update instruction is a trigger instruction that triggers the terminal to update the correspondence, stored in the terminal, between a country code, an MCC, an MNC, and an operator;

receiving, by the server, a data request instruction from the terminal according to the data update instruction; and sending, by the server, the changed correspondence to the terminal according to the data request instruction such that the terminal updates the correspondence stored in the terminal.

* * * * *

UNITED STATES PATENT AND TRADEMARK OFFICE
CERTIFICATE OF CORRECTION

PATENT NO. : 10,064,044 B2
APPLICATION NO. : 15/512352
DATED : August 28, 2018
INVENTOR(S) : Tao Zhu Page 1 of 1

It is certified that error appears in the above-identified patent and that said Letters Patent is hereby corrected as shown below:

In the Claims

Column 30, Line 65: "Which" should read "which"

Signed and Sealed this
Second Day of October, 2018

Andrei Iancu
*Director of the United States Patent and Trademark Office*